(12) United States Patent
Hayashi et al.

(10) Patent No.: US 12,452,453 B2
(45) Date of Patent: Oct. 21, 2025

(54) IMAGE PROCESSING DEVICE AND METHOD

(71) Applicant: Sony Group Corporation, Tokyo (JP)

(72) Inventors: Kao Hayashi, Kanagawa (JP); Satoru Kuma, Tokyo (JP); Ohji Nakagami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 287 days.

(21) Appl. No.: 18/029,789

(22) PCT Filed: Sep. 24, 2021

(86) PCT No.: PCT/JP2021/034939
§ 371 (c)(1),
(2) Date: Mar. 31, 2023

(87) PCT Pub. No.: WO2022/075074
PCT Pub. Date: Apr. 14, 2022

(65) Prior Publication Data
US 2023/0370637 A1    Nov. 16, 2023

(30) Foreign Application Priority Data
Oct. 7, 2020 (JP) .................................. 2020-170070

(51) Int. Cl.
*H04N 19/597* (2014.01)
*G06T 7/40* (2017.01)
(Continued)

(52) U.S. Cl.
CPC ............. *H04N 19/597* (2014.11); *G06T 7/40* (2013.01); *G06T 7/74* (2017.01); *H04N 19/46* (2014.11);
(Continued)

(58) Field of Classification Search
CPC ........ H04N 19/597; H04N 19/46; G06T 7/74; G06T 7/40; G06T 2207/10016
See application file for complete search history.

(56) References Cited

U.S. PATENT DOCUMENTS

2019/0139266 A1* 5/2019 Budagavi ................ G06T 17/20
2020/0005518 A1* 1/2020 Graziosi .............. H04N 19/597
(Continued)

FOREIGN PATENT DOCUMENTS

| JP | 3902953 | * | 1/2002 |
| WO | WO 2020/145143 A1 | | 7/2020 |
| WO | WO 2020/162542 A1 | | 8/2020 |

OTHER PUBLICATIONS

Naoki Ito translation of JP 3902953 Jan. 10, 2002 (Year: 2002).*
(Continued)

*Primary Examiner* — Zaihan Jiang
(74) *Attorney, Agent, or Firm* — Paratus Law Group, PLLC

(57) ABSTRACT

There is provided an image processing device and method capable of suppressing an increase in amount of code. For example, a patch generation parameter used in patch generation processing for generating a patch of an attribute serving as a processing target by referring to an attribute different from the attribute serving as the processing target is derived for some of a plurality of attributes corresponding to single geometry of a point cloud that expresses an object having a three-dimensional shape as a set of points, the derived patch generation parameter is encoded, and an attribute video frame in which a base patch representing a base attribute that is an attribute different from some of the plurality of attributes has been arranged is encoded. The present disclosure can be applied to, for example, an image processing device, an electronic device, an image processing method, or a program.

18 Claims, 27 Drawing Sheets

(51) Int. Cl.
*G06T 7/73* (2017.01)
*H04N 19/46* (2014.01)

(52) U.S. Cl.
CPC ............... *G06T 2207/10016* (2013.01); *G06T 2207/10028* (2013.01)

(56) References Cited

U.S. PATENT DOCUMENTS

| | | | |
|---|---|---|---|
| 2020/0014953 A1* | 1/2020 | Mammou | H04N 19/17 |
| 2020/0020132 A1* | 1/2020 | Sinharoy | H03M 7/70 |
| 2020/0105024 A1* | 4/2020 | Mammou | G06T 9/001 |
| 2020/0219288 A1* | 7/2020 | Joshi | G06T 9/40 |
| 2021/0005006 A1* | 1/2021 | Oh | H04N 21/85406 |
| 2021/0005016 A1* | 1/2021 | Oh | G06T 9/001 |
| 2021/0006833 A1* | 1/2021 | Tourapis | G06T 7/10 |
| 2021/0209806 A1* | 7/2021 | Oh | H04N 19/597 |
| 2021/0409768 A1* | 12/2021 | Joshi | H04N 19/174 |
| 2022/0191519 A1* | 6/2022 | Chevet | H04N 19/597 |

OTHER PUBLICATIONS

Information technology—MPEG-I (Coded Representation of Immersive Media)—Part 9: Geometry-based Point Cloud Compression, ISO/IEC 23090-9:2019(E), 2019, pp. 1-96.

Mammou et al., Video-based and Hierarchical Approaches Point Cloud Compression, International Organization for Standardization, ISO/IEC JTC1/SC29/WG11, Oct. 2017, pp. 1-3, Macau, China.

Mammou, PCC Test Model Category 2 v0, International Organisation for Standardisation, ISO/IEC JTC1/SC29/WG11, Oct. 2017, pp. 1-11, Macau, China.

Li et al., Video-based compression for plenoptic point clouds, arXiv.org, Nov. 4, 2019, pp. 1-10.

Golla et al., Real-time Point Cloud Compression, IEEE, Sep. 2015, pp. 1-6.

Krivokuca et al., 8i Voxelized Surface Light Field (8iVSLF) Dataset, International Organisation for Standardisation, ISO/IEC JTC1/SC29/WG11, Jul. 2018, pp. 1-8, Ljubljana, Slovenia.

Zhang et al., Surface Light Field Compression Using a Point Cloud Codec, IEEE Journal on Emerging and Selected Topics in Circuits and Systems, Mar. 2019, pp. 163-176, vol. 9, No. 1.

* cited by examiner

Fig. 6

| ID | CONVERSION METHOD | CONVERSION TARGET ATTRIBUTE ID | ADDITIONAL TRANSMISSION INFORMATION |
|---|---|---|---|
| 0 | max and min REVERSAL OF EACH COLOR COMPONENT | $ID_1$ | |
| 1 | max and min REVERSAL OF Luma | $ID_1$ | |
| 2 | AVERAGE OF COLOR COMPONENTS OF TWO CAMERAS | $ID_1, ID_2$ | |
| 3 | AVERAGE OF Luma OF TWO CAMERAS | $ID_1, ID_2$ | |
| 4 | WEIGHTED AVERAGE OF EACH COLOR COMPONENT ACCORDING TO CAMERA DISTANCE TO TWO CAMERAS AND POSITION OF PATCH | $ID_1, ID_2$ | CAMERA POSITION OF ID1, ID2 |
| 5 | WEIGHTED AVERAGE OF Luma ACCORDING TO CAMERA DISTANCE TO TWO CAMERAS AND POSITION OF PATCH | $ID_1, ID_2$ | CAMERA POSITION OF ID1, ID2 |
| 6 | WEIGHTED AVERAGE OF EACH COLOR COMPONENT ACCORDING TO CAMERA DISTANCE TO THREE CAMERAS AND POSITION OF PATCH | $ID_1, ID_2, ID_3$ | CAMERA POSITION OF ID1, ID2, AND ID3 |
| 7 | WEIGHTED AVERAGE OF Luma ACCORDING TO CAMERA DISTANCE TO THREE CAMERAS AND POSITION OF PATCH | $ID_1, ID_2, ID_3$ | CAMERA POSITION OF ID1, ID2, AND ID3 |
| ... | ... | ... | ... |

Fig. 11

| PATCH Offset | VoxelOffset | CONVERSION FUNCTION | FLAG |
|---|---|---|---|
| OFF | OFF | OFF | 000 |
| OFF | OFF | ON | 001 |
| OFF | ON | OFF | 010 |
| OFF | ON | ON | 011 |
| ON | OFF | OFF | 100 |
| ON | OFF | ON | 101 |
| ON | ON | OFF | 110 |
| ON | ON | ON | 111 |

Fig. 12

| PATCH ID | REFERENCE CAMERA ID | CONVERSION FLAG | OTHER CONVERSION INFORMATION |
|---|---|---|---|
| 1 | cam#1 | FLAG=100 | PATCH Offset (2,1,1) |
| 2 | cam#4 | FLAG=010 | Voxel ID=3, 4, 5, VoxelOffset = (2, 2, 1) |
| 4 | cam#2, cam#3 | FLAG=001 | CONVERSION DESIGNATION param=2 |
| 6 | cam#1 | FLAG=000 | |
| ... | ... | ... | ... |

IMAGE PROCESSING DEVICE AND METHOD

CROSS REFERENCE TO PRIOR APPLICATION

This application is a National Stage Patent Application of PCT International Patent Application No. PCT/JP2021/034939 (filed on Sep. 24, 2021) under 35 U.S.C. § 371, which claims priority to Japanese Patent Application No. 2020-170070 (filed on Oct. 7, 2020), which are all hereby incorporated by reference in their entirety.

TECHNICAL FIELD

The present disclosure relates to an image processing device and method, and more particularly, to an image processing device and method capable of suppressing increase in amount of code.

BACKGROUND ART

In the related art, standardization of encoding and decoding of point cloud data representing an object having a three-dimensional shape as a set of points is performed in the moving picture experts group (MPEG) (see, for example, NPL 1).

Further, a method of projecting geometry data and attribute data of the point cloud onto a two-dimensional plane for each small area, arranging an image (patch) projected onto the two-dimensional plane in a frame image of a video, and encoding the frame image using an encoding method for a two-dimensional image (hereinafter also referred to as a video-based approach) has been proposed (see, for example, NPL 2 to NPL 4).

Further, in the video-based approach, multi-attribute, which is a scheme for providing a plurality of attributes for single geometry, has been proposed (see NPL 5, for example). In the case of this method, each of the attributes is converted into a frame image and encoded as described above. That is, frame images of a plurality of attributes are formed for each frame image of a geometry.

CITATION LIST

Non Patent Literature

[NPL 1]
"Information technology—MPEG-I (Coded Representation of Immersive Media)—Part 9: Geometry-based Point Cloud Compression", ISO/IEC 23090-9:2019(E)
[NPL 2]
Tim Golla and Reinhard Klein, "Real-time Point Cloud Compression", IEEE, 2015
[NPL 3]
K. Mammou, "Video-based and Hierarchical Approaches Point Cloud Compression", MPEG m41649, October 2017
[NPL 4]
K. Mammou, "PCC Test Model Category 2 v0", N17248 MPEG output document, October 2017
[NPL 5]
Maja Krivoku.a, Philip A. Chou, and Patrick Savill, "8i Voxelized Surface Light Field (8iVSLF) Dataset", ISO/IEC JTC1/SC29/WG11 MPEG2018/m42914, July 2018, Ljubljana

SUMMARY

Technical Problem

However, in the case of the multi-attribute described in NPL 5, respective attribute video frames are encoded independently of each other. For example, it has not been possible to perform encoding using a correlation between attributes. This causes concern that an amount of data to be encoded will increase and an amount of code will increase.

The present disclosure has been made in view of such circumstances, and is intended to suppress an increase in amount of code.

Solution to Problem

An image processing device according to an aspect of the present technology is an image processing device including: a patch generation parameter derivation unit configured to derive a patch generation parameter used in patch generation processing for generating a patch of an attribute serving as a processing target by referring to an attribute different from the attribute serving as the processing target, for some of a plurality of attributes corresponding to single geometry of a point cloud that expresses an object having a three-dimensional shape as a set of points; a patch generation parameter encoding unit configured to encode the patch generation parameter derived by the patch generation parameter derivation unit; and an attribute video frame encoding unit configured to encode an attribute video frame in which a base patch representing a base attribute that is an attribute different from some of the plurality of attributes has been arranged, and omit encoding of the attribute video frame in which patches representing some of the attributes have been arranged.

An image processing method according to an aspect of the present technology is an image processing method including: deriving a patch generation parameter used in patch generation processing for generating a patch of an attribute serving as a processing target by referring to an attribute different from the attribute serving as the processing target, for some of a plurality of attributes corresponding to single geometry of a point cloud that expresses an object having a three-dimensional shape as a set of points; encoding the derived patch generation parameter; and encoding an attribute video frame in which a base patch representing a base attribute that is an attribute different from some of the plurality of attributes has been arranged, and omitting encoding of the attribute video frame in which patches representing some of the attributes have been arranged.

An image processing device according to another aspect of the present technology is an image processing device including: a patch generation parameter decoding unit configured to decode encoded data, and generate a patch generation parameter used in patch generation processing for generating a patch of an attribute serving as a processing target by referring to an attribute different from the attribute serving as the processing target, for some of a plurality of attributes corresponding to single geometry of a point cloud that expresses an object having a three-dimensional shape as a set of points; a patch generation processing unit configured to perform the patch generation processing using the patch generation parameter generated by the patch generation parameter decoding unit and a base patch representing a base attribute that is an attribute different from some of the attributes, to obtain the patches of some of the attributes; and a point cloud generation unit configured to generate the point cloud using the base patch and the patch obtained by the patch generation processing unit performing the patch generation processing.

An image processing method according to another aspect of the present technology is an image processing method including:

decoding encoded data, and generating a patch generation parameter used in patch generation processing for generating a patch of an attribute serving as a processing target by referring to an attribute different from the attribute serving as the processing target, for some of a plurality of attributes corresponding to single geometry of a point cloud that expresses an object having a three-dimensional shape as a set of points; performing the patch generation processing using the generated patch generation parameter and a base patch representing a base attribute that is an attribute different from some of the attributes, to obtain the patches of some of the attributes; and generating the point cloud using the base patch, and the patch obtained by performing the patch generation processing.

In the image processing device and method according to the aspects of the present technology, the patch generation parameter used in the patch generation processing for generating the patch of the attribute serving as a processing target by referring to the attribute different from the attribute serving as the processing target is derived for some of the plurality of attributes corresponding to the single geometry of the point cloud that expresses the object having a three-dimensional shape as a set of points, the derived patch generation parameter is encoded, the attribute video frame in which the base patch representing the base attribute that is the attribute different from some of the plurality of attributes has been arranged is encoded, and encoding of the attribute video frame in which the patches representing some of the attributes have been arranged is omitted.

In the image processing device and method according to the other aspects of the present technology, the encoded data is decoded, the patch generation parameter used in the patch generation processing for generating the patch of the attribute serving as a processing target by referring to the attribute different from the attribute serving as the processing target is generated for some of the plurality of attributes corresponding to the single geometry of the point cloud that expresses the object having a three-dimensional shape as a set of points, the generated patch generation parameter and the base patch representing the base attribute that is the attribute different from some of the attributes are used to perform the patch generation processing and obtain the patches of some of the attributes, and the base patch and the patches of the plurality of attributes obtained by the patch generation processing being performed are used to generate the point cloud.

BRIEF DESCRIPTION OF DRAWINGS

FIG. 6 is a diagram illustrating examples of conversion method designation information.
FIG. 11 is a diagram illustrating an example of patch generation method designation information.
FIG. 12 is a diagram illustrating examples of a patch generation parameter.

DESCRIPTION OF EMBODIMENTS

Figure 1:
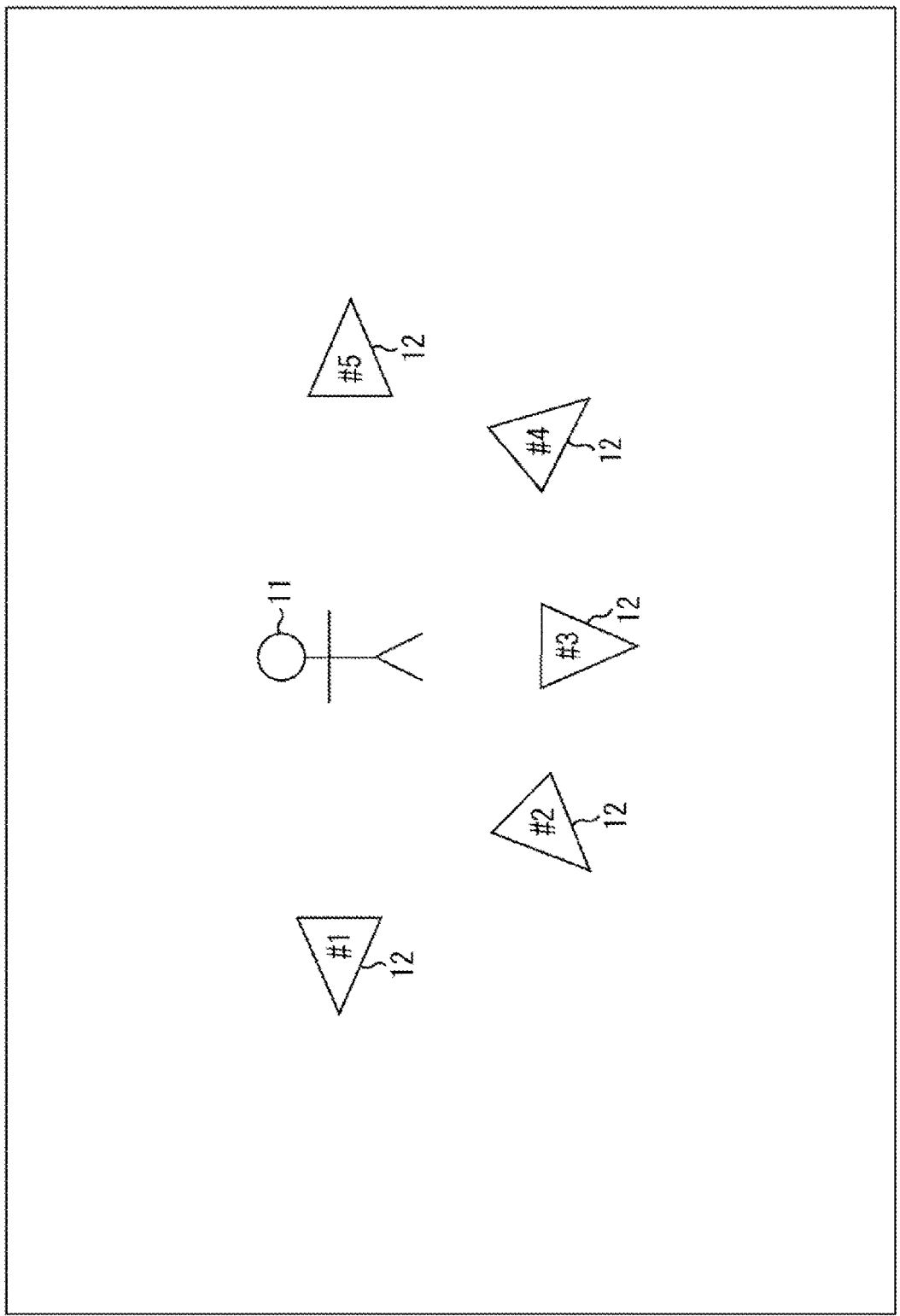
FIG. 1 is a diagram illustrating multi-attribute.

Hereinafter, a form for carrying out the present disclosure (hereinafter referred to as an embodiment) will be described. The description will be given in the following order.
1. Patch Generation in Which Other Attribute is Referred to
2. First Embodiment (Encoding Device)
3. Second Embodiment (Decoding Device)
4. Supplements 1. Patch Generation in which Other Attribute is Referred To <Literature that Supports Technical Content and Technical Terms, or the Like>

The scope disclosed in the present technology includes not only the content described in the embodiments, but also the content described in the following NPL known at the time of filing or the content of other literature referred to in the following NPL.
NPL 1: (described above)
NPL 2: (described above)
NPL 3: (described above)

NPL 4: (described above)
NPL 5: (described above)

That is, content described in the above-described NPLs, content of other literatures referred to in the above-described NPLs, and the like are also the basis for determining support requirements.

<Point Cloud>

In the related art, there is 3D data such as a point cloud representing a three-dimensional structure using, for example, position information or attribute information of a point.

For example, in the case of a point cloud, a three-dimensional structure (an object having a three-dimensional shape) is expressed as a set of a large number of points. The point cloud includes position information (also called geometry) and attribute information (also called attributes) of each point. The attributes can include any information. For example, color information, reflectance information, or normal line information of each point may be included in the attributes. Thus, the point cloud has a relatively simple data structure and can represent any three-dimensional structure with sufficient accuracy by using a sufficiently large number of points.

<Quantization of Position Information Using Voxels>

Since an amount of data of such a point cloud (also called point cloud data) is relatively large, an encoding method using voxels has been considered in order to compress the amount of data through encoding or the like. A voxel is a three-dimensional area for quantizing geometry (positional information).

That is, the three-dimensional area (also called a bounding box) including the point cloud is divided into small three-dimensional areas called voxels, and whether or not each voxel includes a point is indicated. By doing so, the position of each point is quantized in units of voxels. Therefore, it is possible to suppress an increase in amount of information (typically to reduce the amount of information) by converting point cloud data into data of such a voxel (also referred to as voxel data).

<Overview of Video-Based Approach>

In a video-based approach, geometry or an attribute of such a point cloud is projected onto a two-dimensional plane for each small area (connection component). In the present disclosure, this small area may be referred to as a partial area. An image obtained by projecting the geometry or attribute onto the two-dimensional plane is also called a projection image. Further, a projection image for this small area (partial area) is called a patch. For example, in a projection image (patch) of the geometry, position information of the point is expressed as position information (depth value (Depth)) in a direction perpendicular to a projection plane (a depth direction).

Each patch that has been generated in this way is then arranged within a frame image of a video sequence (also called a video frame). A frame image in which patches of the geometry have been arranged is also called a geometry video frame. Further, a frame image in which patches of the attribute have been arranged is also called an attribute video frame. For example, each pixel value of the geometry video frame indicates a depth value described above.

These video frames are encoded by using an encoding method for a two-dimensional image such as advanced video coding (AVC) or high efficiency video coding (HEVC). That is, it is possible to encode the point cloud data, which is 3D data representing a three-dimensional structure, using a codec for a two-dimensional image.

<Occupancy Map>

An occupancy map can also be used in the case of such a video-based approach. The occupancy map is map information indicating the presence or absence of a projection image (patch) for every N×N pixels of the geometry video frame or attribute video frame. For example, in the occupancy map, an area (N×N pixels) of the geometry video frame or the attribute video frame in which there is a patch is indicated by a value "1", and an area (N×N pixels) in which there is no patch is indicated by a value "0".

Such an occupancy map is encoded as data separate from the geometry video frame or the attribute video frame and transmitted to the decoding side. Since it is possible for a decoder to ascertain whether or not an area is an area in which there is a patch by referring to this occupancy map, it is possible to suppress an influence of, for example, noise caused by encoding or decoding, and restore 3D data more accurately. For example, even when the depth value changes due to encoding or decoding, the decoder can ignore a depth value of the area in which there is no patch by referring to the occupancy map (prevent processing from being performed as position information of 3D data).

This occupancy map can also be transmitted as a video frame, like the geometry video frame, the attribute video frame, and the like.

<Auxiliary Patch Information>

Further, in the case of the video-based approach, information on a patch (also called auxiliary patch information) is transmitted as metadata.

<Video Image>

In the following description, it is assumed that (an object of) the point cloud can change in a direction of time, like a two-dimensional moving image. That is, geometry data or attribute data has a concept of time direction, and is data sampled at predetermined time intervals, like a two-dimensional moving image. Data at each sampling time is called a frame, like a video frame of a two-dimensional image. That is, it is assumed that the point cloud data (the geometry data or attribute data) consists of a plurality of frames, like a two-dimensional moving image. In the present disclosure, a frame of this point cloud is also referred to as a point cloud frame. In the case of the video-based approach, even when a point cloud is such a point cloud of the moving image (a plurality of frames), it is possible to perform encoding with high efficiency using a moving image encoding scheme by converting each point cloud frame into a video frame to obtain a video sequence.

<Multi Attribute>

NPL 5 discloses the multi-attribute that is a scheme for providing a plurality of attributes for single geometry in such a video-based approach. By associating a plurality of attributes with single geometry, it is possible to select a more appropriate attribute at the time of rendering or to generate the more appropriate attribute using a plurality of attributes, and it is possible to suppress reduction in subjective image quality of an image for a display, for example.

For example, as illustrated in FIG. 1, it is assumed that an object 11, which is a subject, is imaged by cameras 12, and an attribute of a point cloud of the object 11 is generated using a texture of the object obtained from a captured image. One geometry of the point cloud of the object 11 is generated because the geometry is position information of each point. On the other hand, since the number of cameras 12 (#1 to #5) is five, five captured images can be obtained.

In such a case, when textures of the object 11 included in the respective captured images (pattern, color, brightness, texture, or the like of a surface of the object 11) are assumed to be independent attributes, five attributes are generated for one piece of geometry. As illustrated in FIG. 1, positions and directions of the five cameras 12 are different from each other. In general, an appearance of (the texture of) the object 11 can vary depending on a position and direction of a viewpoint. Therefore, the textures of the respective attributes can be different from each other.

By associating textures obtained from a plurality of viewpoints with single geometry in this way, it is possible to select textures with closer positions and directions of viewpoints or generate more appropriate textures using a plurality of textures at the time of rendering, and it is possible to suppress reduction in subjective image quality of an image for a display.

Figure 2:
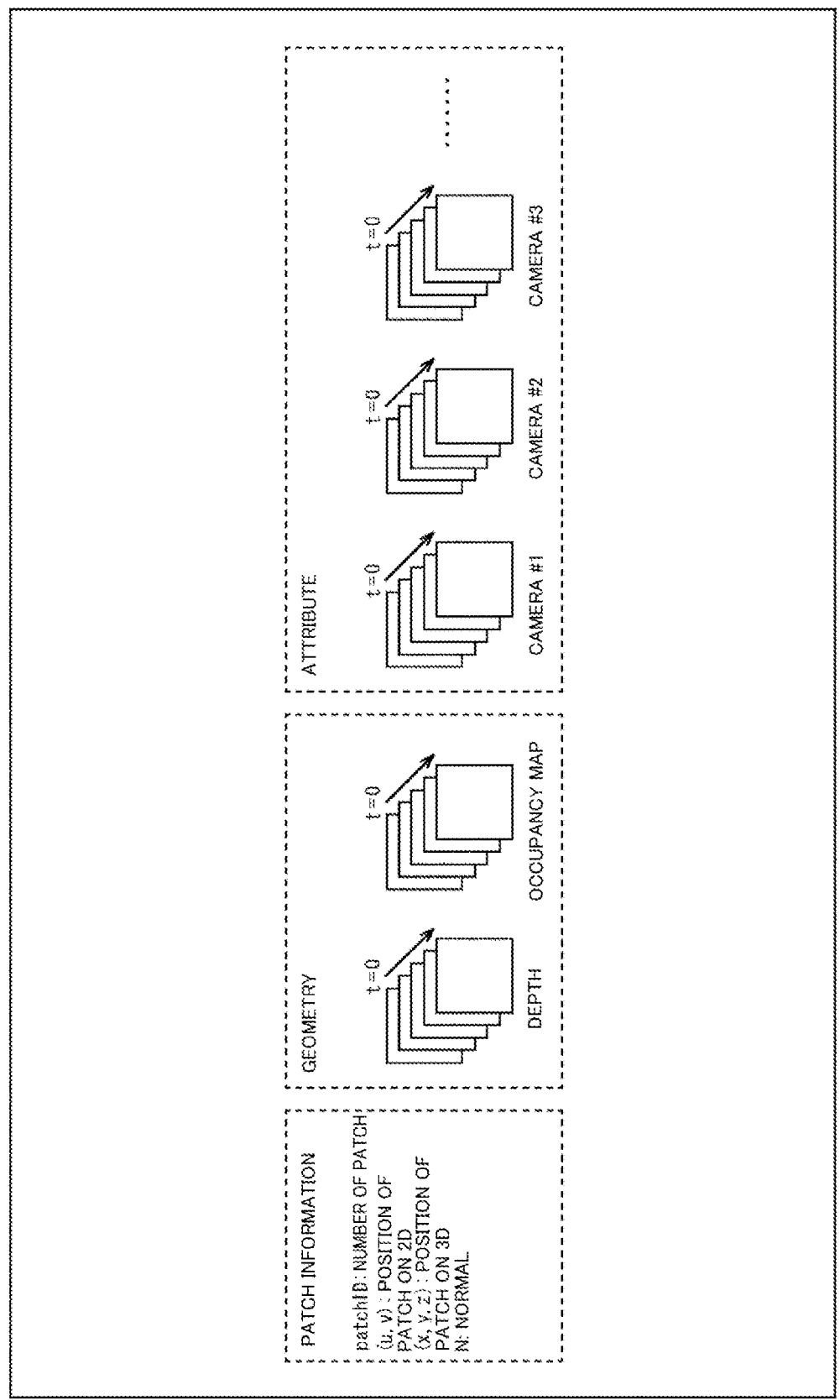
FIG. 2 is a diagram illustrating multi-attribute.

When such a multi-attribute is applied in the video-based approach, an attribute video frame is generated for each camera (that is, for each attribute), as illustrated in FIG. 2. Thus, patch information (the auxiliary patch information), single the geometry video frame (depth), an occupancy map, and a plurality of attributes video frames are encoded, as illustrated in FIG. 2. The video frames or the auxiliary patch information is generated for each point cloud frame.

As illustrated in FIG. 2, information such as identification information (patch ID) of the patch, a position (u0, v0) of the patch on a 2D projection plane (a two-dimensional plane onto which a connection component (a small area) of the point cloud is projected), a position (u, v, d) in a three-dimensional space of the projection plane, and a normal (n) is included in the patch information. Further, information such as a width of the patch or a height of the patch may be included in the patch information.

However, in the case of multi-attribute described in NPL 5, the respective attribute video frames are encoded independently of each other, and encoding cannot be performed using a correlation between the attributes. This causes concern that an amount of data to be encoded increases and an amount of code increases.

When the amount of code increases, there is concern that a load of encoding processing or decoding processing increases, and a load when encoded data is transmitted or stored (for example, a load of a transmission medium or storage medium) also increases. This causes concern that a cost of a device or system regarding the video-based approach increases.

Therefore, encoding is performed using the correlation between the attributes in order to suppress an increase in amount of code. That is, on the decoding side, patches of some of a plurality of attributes constituting the multi-attribute are generated by referring to patches of the other attributes. Processing for generating a patch by referring to the other attribute is also called patch generation processing. Further, the other attribute indicates an attribute different from an attribute serving as a processing target among the plurality of attributes of the multi-attribute. Further, the attribute serving as the processing target is also referred to as its own attribute.

Encoding (transmission) of the attribute video frame in which the patches of some of the attributes have been arranged is omitted. That is, only an attribute video frame in which patches of attributes other than some of the attributes have been arranged is encoded (transmitted). Further, a patch generation parameter used in such patch generation processing is derived and signaled (transmitted). That is, on the decoding side, the above-described patch generation processing is performed using the signaled patch generation parameter, and patches of some attribute of which encoding (transmission) has been omitted are generated.

For example, a patch generation parameter used in patch generation processing for generating a patch of an attribute serving as a processing target by referring to an attribute different from the attribute serving as the processing target may be derived for some of a plurality of attributes corresponding to single geometry of a point cloud that expresses an object having a three-dimensional shape as a set of points, the derived patch generation parameter may be encoded, an attribute video frame in which a base patch representing a base attribute that is an attribute different from some of the plurality of attributes has been arranged may be encoded, and encoding of the attribute video frame in which patches representing some of the attributes have been arranged may be omitted.

Further, the image processing device may include a patch generation parameter derivation unit configured to derive a patch generation parameter used in patch generation processing for generating a patch of an attribute serving as a processing target by referring to an attribute different from the attribute serving as the processing target, for some of a plurality of attributes corresponding to single geometry of a point cloud that expresses an object having a three-dimensional shape as a set of points; a patch generation parameter encoding unit configured to encode the patch generation parameter derived by the patch generation parameter derivation unit; and an attribute video frame encoding unit configured to encode an attribute video frame in which a base patch representing a base attribute that is an attribute different from some of the plurality of attributes has been arranged, and omit encoding of the attribute video frame in which patches representing some of the attributes have been arranged.

Further, for example, encoded data may be decoded, a patch generation parameter used in patch generation processing for generating a patch of an attribute serving as a processing target by referring to an attribute different from the attribute serving as the processing target may be generated for some of a plurality of attributes corresponding to single geometry of a point cloud that expresses an object having a three-dimensional shape as a set of points, the patch generation processing may be performed by using the generated patch generation parameter and a base patch representing a base attribute that is an attribute different from some of the attributes to obtain the patches of some of the attributes, and the point cloud may be generated by using the base patch and the patch obtained by performing the patch generation processing.

For example, the image processing device may include a patch generation parameter decoding unit that decodes encoded data and generates a patch generation parameter used in patch generation processing for generating a patch of an attribute serving as a processing target by referring to an attribute different from the attribute serving as the processing target, for some of a plurality of attributes corresponding to single geometry of a point cloud that expresses an object having a three-dimensional shape as a set of points; a patch generation processing unit configured to perform the patch generation processing using the patch generation parameter generated by the patch generation parameter decoding unit and a base patch representing a base attribute that is an attribute different from some of the attributes, to obtain the patches of some of the attributes; and a point cloud generation unit configured to generate the point cloud using the base patch and the patch obtained by the patch generation processing unit performing the patch generation processing.

Each attribute of the multi-attribute is an attribute corresponding to a common geometry, such as a texture of one object. Therefore, the correlation between the attributes is generally high. Therefore, it is possible to suppress a decrease in encoding efficiency and an increase in amount of code by performing encoding using the correlation between the attributes.

In the present disclosure, it is assumed that the attribute includes the texture of the object having a three-dimensional shape (pattern, color, brightness, texture, or the like of the surface of the object). Further, it is assumed that the texture of the object included in each of a plurality of captured images obtained by performing imaging using a plurality of cameras is associated with one piece of geometry of the object as multi-attribute. In other words, it is assumed that the plurality of attributes corresponding to the single geometry as the multi-attribute includes the texture of the object included in a captured image obtained by imaging being performed using cameras installed at different positions and directions.

That is, captured images corresponding to the respective attributes have different angles of view. A position and direction of the camera is also referred to as a "viewpoint" for viewing an object. That is, the plurality of attributes corresponding to the single geometry as the multi-attribute are assumed to include textures of the object obtained from different viewpoints.

An encoding method using the correlation between the attributes may be any method. Hereinafter, examples thereof will be described.

<Patch Offset>

For example, the decoding side may add a common offset to a plurality of points of another attribute (an attribute different from the attribute serving as the processing target among the plurality of attributes of the multi-attribute) so that its own attribute that is a processing target is generated. The offset may be encoded (transmitted).

For example, processing for adding a patch offset, which is an offset in units of patches, to a patch of another attribute serving as a reference destination (also referred to as a reference destination patch) may be used as the patch generation processing, and the patch offset may be signaled as the patch generation parameter. In other words, this patch offset may be included in the patch generation parameter. Further, processing for adding the patch offset to the reference patch of the other attribute may be included in the patch generation processing.

Figure 3:
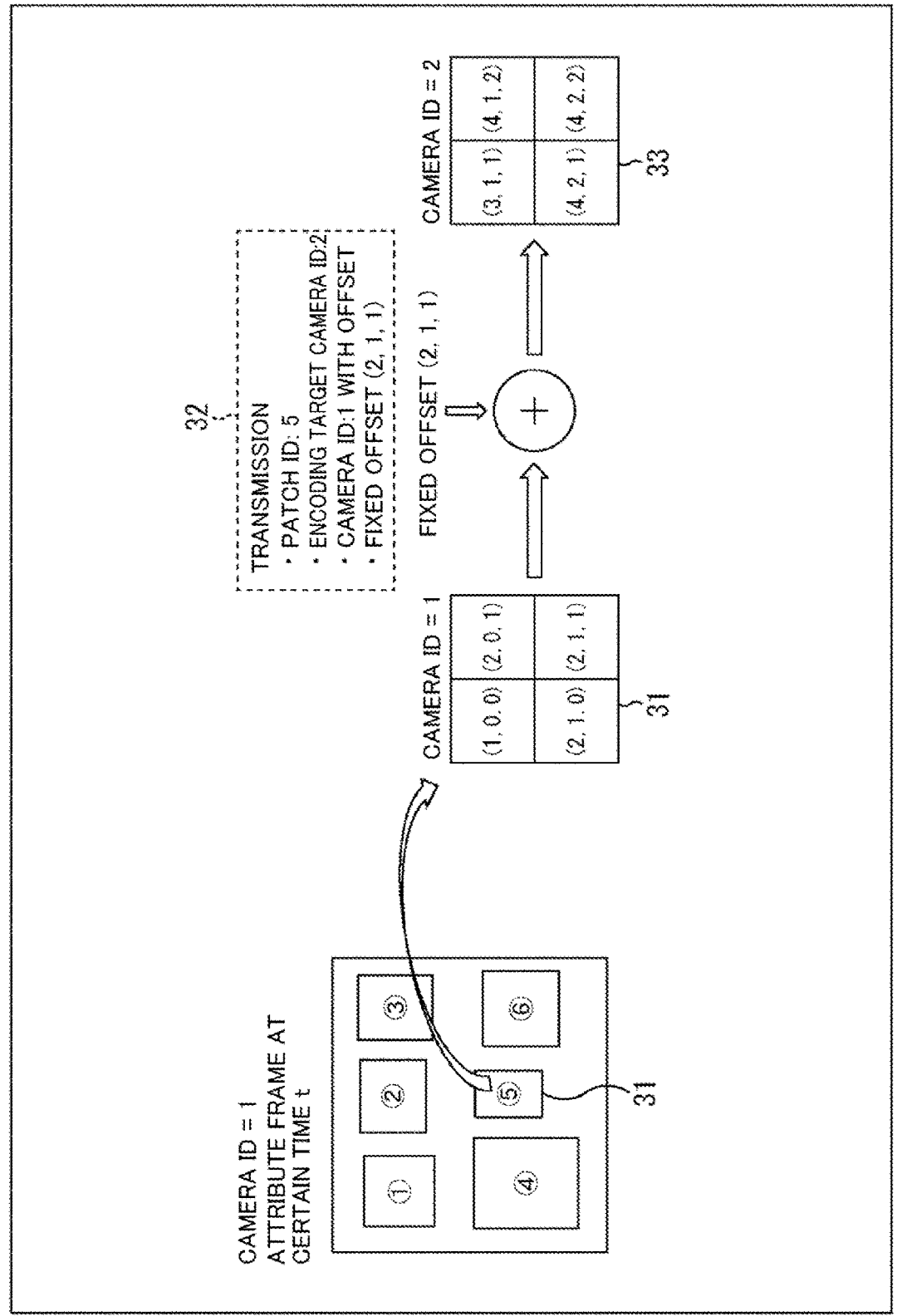
FIG. 3 is a diagram illustrating an example of a patch offset.

For example, in FIG. 3, a patch 31 of camera ID=1 is assumed to have a value as illustrated in FIG. 3. In FIG. 3, squares in the patch 31 represent voxels, and (a, b, c) of each voxel indicates an attribute corresponding to the voxel using (Y, U, V) values. For example, (1,0,0) in an upper left voxel of the patch 31 indicates that the attribute corresponding to this voxel is (Y, U, V)=(1, 0, 0).

As illustrated in FIG. 3, a patch offset (2,1,1) is transmitted as patch information 32, and the patch offset (2,1,1) is added to the patch 31 on the decoding side so that the patch 33 of camera ID=2 is generated. By doing so, it is possible to omit the encoding (transmission) of the data of the patch 33 of camera ID=2. That is, the patch offset (2, 1, 1) only needs to be encoded (transmitted) instead of the data of the patch 33 of camera ID=2.

Since the data of the patch 33 includes attribute corresponding to at least four voxels, the data clearly has more informative than the patch offset (2,1,1). Therefore, by doing so, it is possible to suppress an increase in amount of code (typically, to reduce the amount of code).

In practice, the number of voxels in the patch is generally larger, and it is possible to suppress an increase in amount of code as compared with the example of FIG. 3. By applying such a patch offset, it is possible to provide, for example, a patch obtained by changing a luminance value of a certain patch while suppressing an increase in amount of code. The patch offset can be stored in a patch header and transmitted, for example.

<Voxel Offset>

This offset may be in units of things other than units of patches. For example, the offset may be in units of voxels. For example, processing for adding a voxel offset, which is the offset in units of voxels, to a reference patch of the other attribute serving as the reference destination may be used as patch generation processing so that the voxel offset is signaled (encoded (transmitted)) as a patch generation parameter. In other words, this voxel offset may be included in the patch generation parameter. Further, processing for adding the voxel offset to the reference patch of the other attribute may be included in the patch generation processing.

Figure 4:
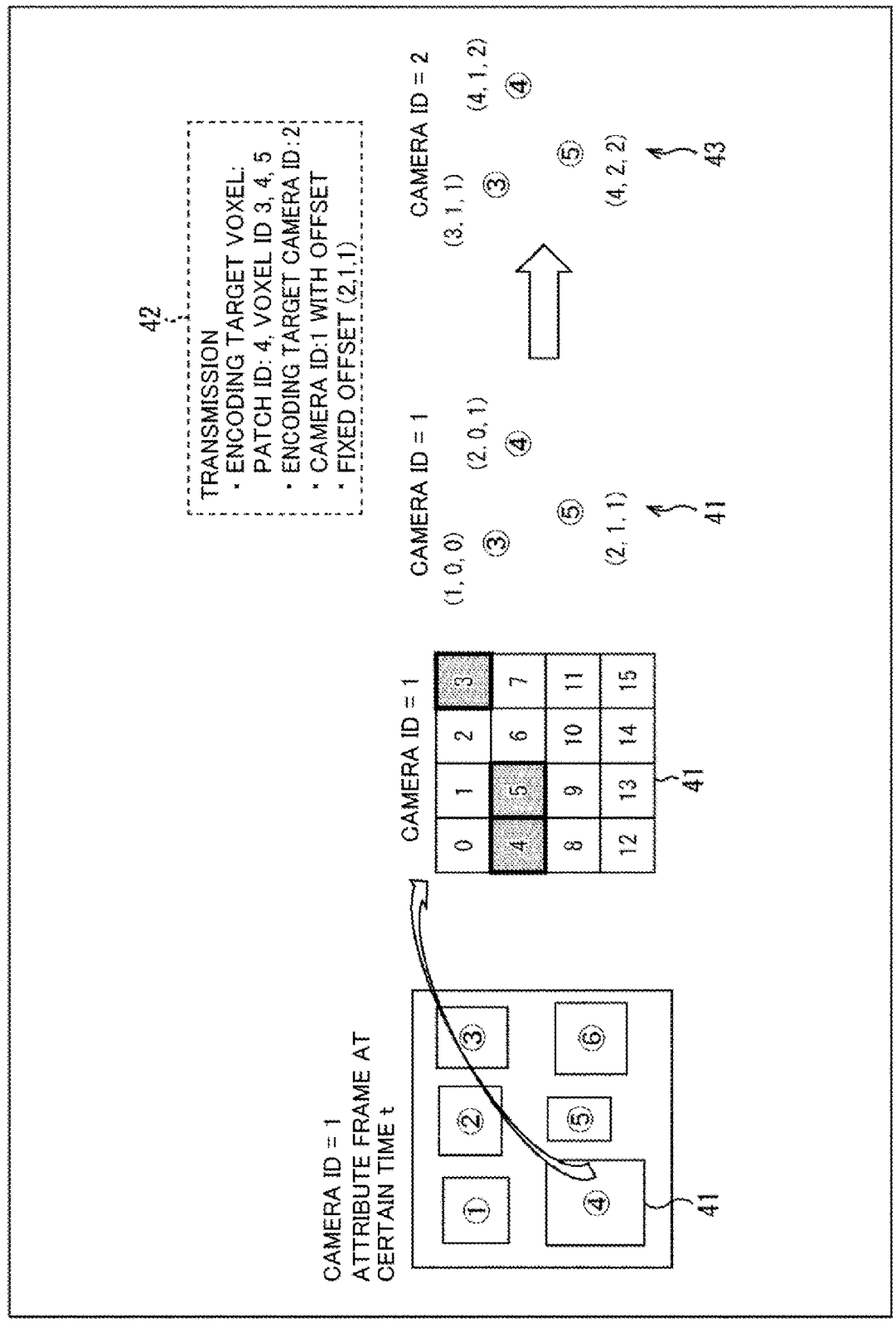
FIG. 4 is a diagram illustrating an example of a voxel offset.

For example, in the case of FIG. 4, patch information 42 including the voxel offset is encoded (transmitted), and a voxel offset (2, 1, 1) is added to patch 41 of camera ID=1 on the decoding side to generate a patch 43 of camera ID=2.

Since the voxel offset can be set independently for each voxel, the offset can be added to some voxels in the patch, as in the example of FIG. 4. That is, a non-uniform offset can be added to the patch.

In this case, the voxel offset also has a small amount of information than the patch. Therefore, by doing so, it is possible to suppress an increase in amount of code (typically, to reduce the amount of code), as in the case of the patch offset.

Any method of designating the voxel to which the offset is added can be used. For example, as illustrated in FIG. 4, the voxel to which the offset is added may be designated by combining a patch ID for identifying a patch with a voxel ID for identifying a voxel within the patch. Further, in-patch coordinates (2D coordinates (x, y)) of the voxel may be applied instead of the voxel ID.

Further, each voxel of each patch may be identified in the entire frame. For example, in-frame coordinates (x, y) of the voxel may be used to designate the voxel to which the offset is to be added. By doing so, it is possible to add, for example, one voxel offset to voxels of a plurality of patches (control over patches becomes possible).

This offset (the patch offset or the voxel offset) may be added to the base attribute. The base attribute may be, for example, a certain attribute of a camera. Alternatively, an average of the attributes of all cameras may be used as the base attribute. In this case, a camera ID different from that of the existing camera (attribute), such as camera ID=0, is assigned to the base attribute. Further, this offset may be added to an EOM patch or a RAW patch.

Further, any format of this offset is used. For example, the offset may be expressed in (Y, U, V) as illustrated in FIGS. 3 and 4, or may be expressed in a format other than the examples, such as (R, G, B). Further, the offset may be an offset for all components of the attribute, or may be an offset for some of the components. For example, the offset may be an offset for only the luminance component.

<Conversion Function>

For example, the decoding side may convert one or more other patches using a predetermined conversion function to generate a patch. The decoding side may encode (transmit) this conversion function or conversion parameter used for the conversion.

Figure 5:
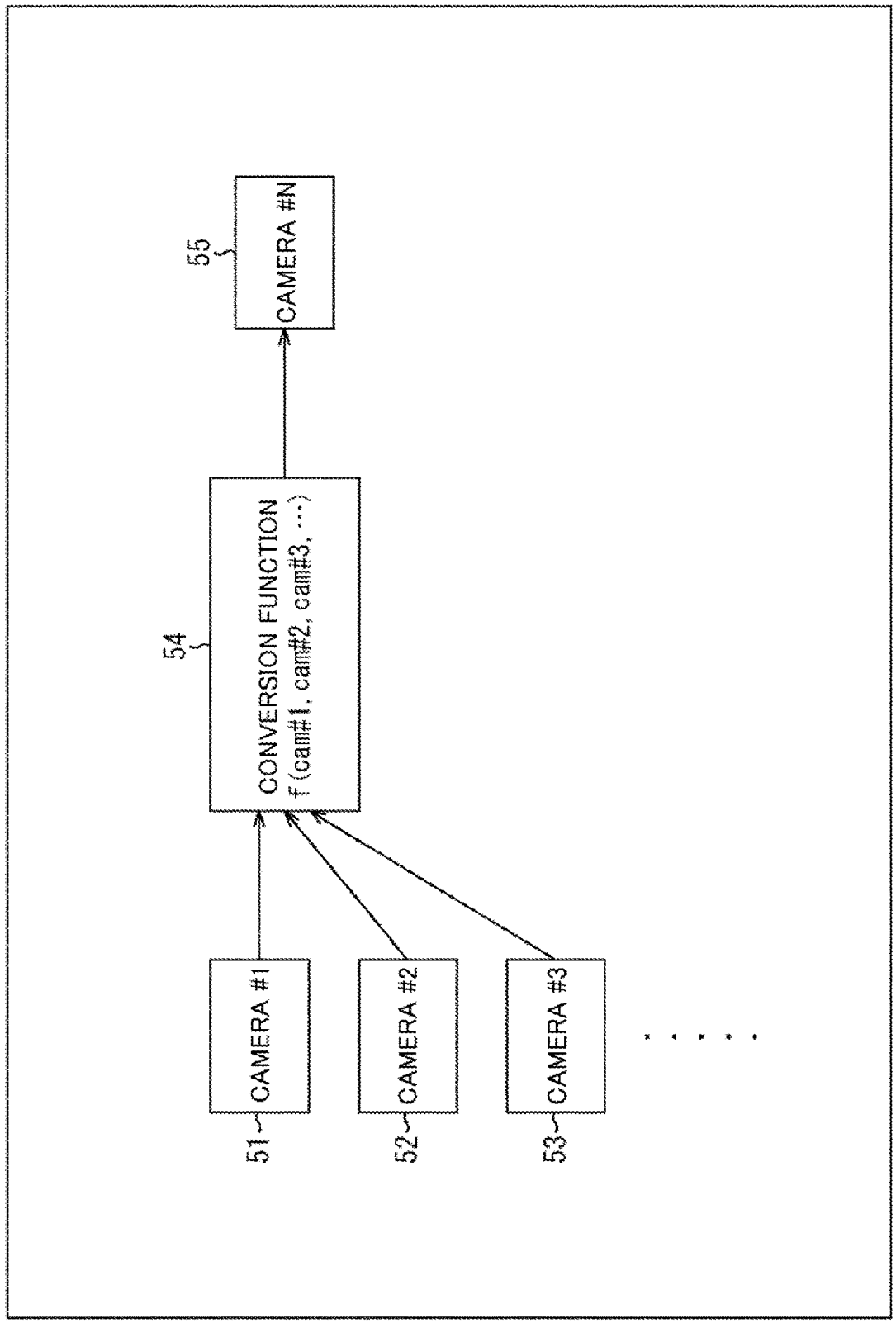
FIG. 5 is a diagram illustrating an example of a conversion function.

For example, as illustrated in FIG. 5, a plurality of patches such as a patch 51 for camera #1, a patch 52 for camera #2, and a patch 53 for camera #3 may be converted using a conversion function 54 (f(cam #1, cam #2, cam #3), ... ) so that a patch 55 for a new camera #N is generated.

By doing so, it is possible to omit the encoding (transmission) of the patch 55 of camera #N. In general, the conversion function 54 has a smaller amount of information than the patch 55. Therefore, by doing so, it is possible to suppress an increase in amount of code (typically, to reduce the amount of code).

Any content of the conversion function f( ) is used. Any number of patches that are conversion targets is also used. For example, one patch may be applied to the conversion function so that a new patch is generated. In this case, for example, a patch of the base attribute may be set as a conversion target. The conversion function may be, for example, reversal between a maximum value and a minimum value (max and min reversal) of luminance.

For example, a plurality of patches may be conversion targets. That is, a new patch may be generated by applying the plurality of patches to the conversion function. In this case, the conversion function may be, for example, an average of the attributes of the plurality of patches that are conversion targets.

Examples of the conversion function (f( ) is shown in the table of FIG. 6. As illustrated in FIG. 6, the conversion function (conversion method) may be max and min reversal of each color component, or may be max and min reversal of a luminance component (Luma). In these cases, one piece of identification information of the attribute (attribute ID or camera ID) of the patch that is a conversion target is designated. The conversion function (conversion method) may be an average of color components of two cameras (attribute) or may be an average of luminance components (Luma) of the two cameras (attribute). In these cases, two pieces of attribute identification information of the patch that is a conversion target are designated.

Further, the conversion function (conversion method) may be a weighted average of each color component according to a distance to the two cameras and a position of the patch, or may be a weighted average of the luminance component (Luma) according to the distance to the two cameras and the position of the patch. In these cases, two pieces of attribute identification information of the patch that is a conversion target are designated. Further, the camera position of each attribute is encoded (transmitted). Once the camera position is transmitted, the camera position can be associated with the camera ID used for conversion thereafter.

The conversion function (conversion method) may be a weighted average of each color component according to distances to three camera and positions of patches, or may be a weighted average of the luminance component (Luma) according to distances to three camera and positions of patches. In these cases, three pieces of attribute identification information of the patch that is a conversion target are designated. Further, the camera position of each attribute is encoded (transmitted). Once the camera position is transmitted, the camera position can be associated with the camera ID used for conversion thereafter.

Further, a plurality of conversion methods may be prepared so that the conversion method to be applied can be selected. For example, different IDs (conversion method designation information) may be assigned to the respective conversion methods shown in the table of FIG. 6, and encoded (transmitted) so that the conversion method to be applied may be designated.

For example, processing for converting the reference patch of the other attribute serving as the reference destination using the conversion function may be used as the patch generation processing, and conversion method designation information for designating the conversion function (conversion method) may be signaled as a patch generation parameter. In other words, the conversion method designation information may be included in the patch generation parameter. Further, the patch generation processing may also include processing for converting a patch of another attribute using a conversion method designated by the conversion method designation information.

By doing so, it is possible to select more diverse conversion methods as candidates, and therefore, to further suppress an increase in amount of code by selecting a more appropriate conversion method.

Alternatively, conversion parameter applied in the conversion method designated by the conversion method designation information may be signaled as the patch generation parameter. In other words, the conversion parameter may be included in the patch generation parameter. Further, processing for applying the conversion parameter to convert the patch of the other attribute may be included in the patch generation processing.

<Max and Min Reversal>

(max and min reversal) of the conversion function will be described. For example, when max is a maximum value within the patch and min is a minimum value within the patch, an output y of the max and min reversal is expressed using the input x as shown in the following equation.

$$y = \text{max} - x + \text{min}$$

Figure 7:
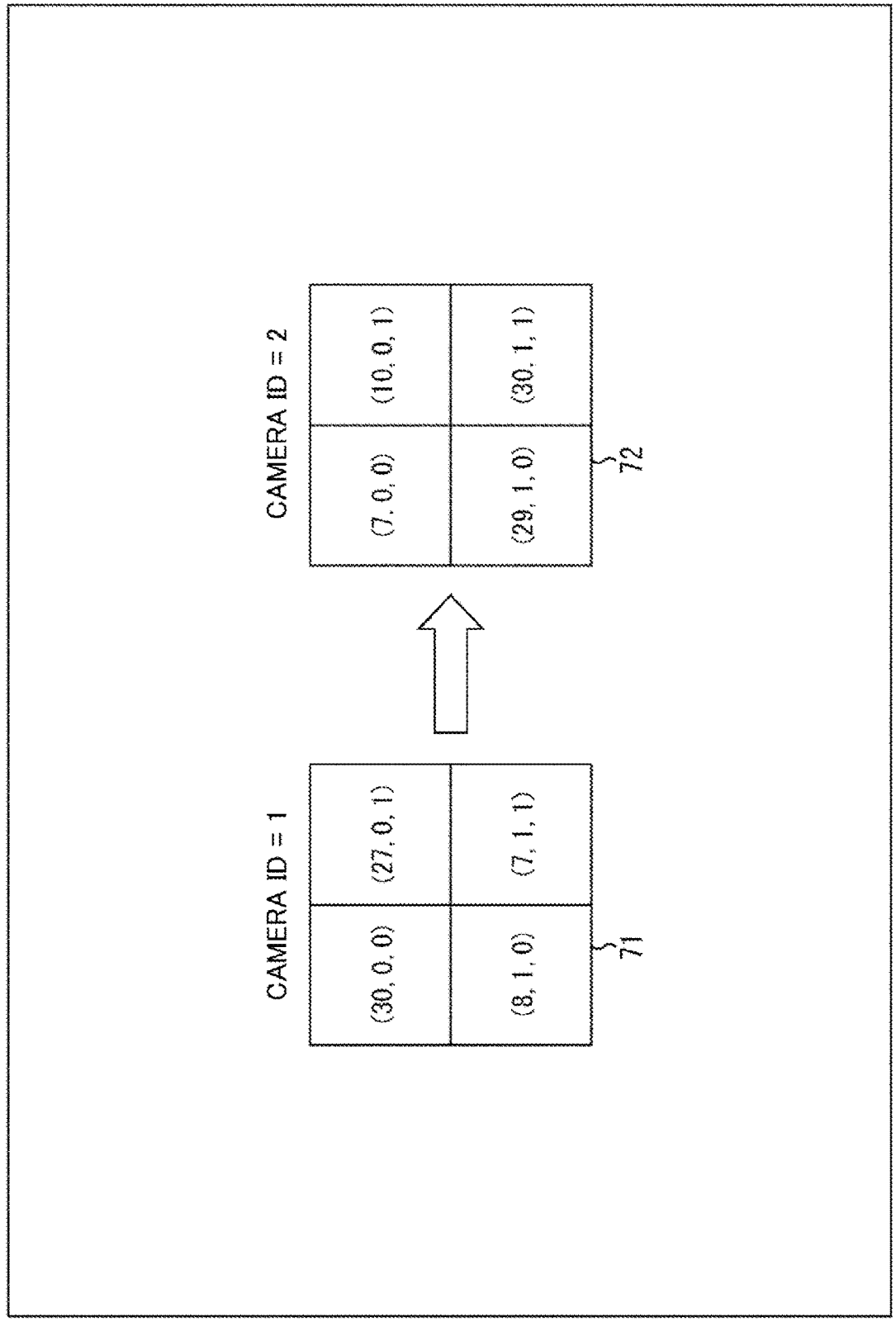
FIG. 7 is a diagram illustrating an example of the conversion function.

For example, when a patch 71 with camera ID=1 as illustrated in FIG. 7 is subjected to the max and min reversal for a luminance component thereof, max=30 and min=7, so that each luminance value is converted as shown in the following equation.

$$y = 37 - x$$

That is, this patch 71 is converted into a patch 72 in FIG. 7.

<Additional Patch>

For example, the decoding side may add an additional patch (difference patch) to the other patch so that a patch is generated. The additional patch (difference patch) may be encoded (transmitted).

Figure 8:
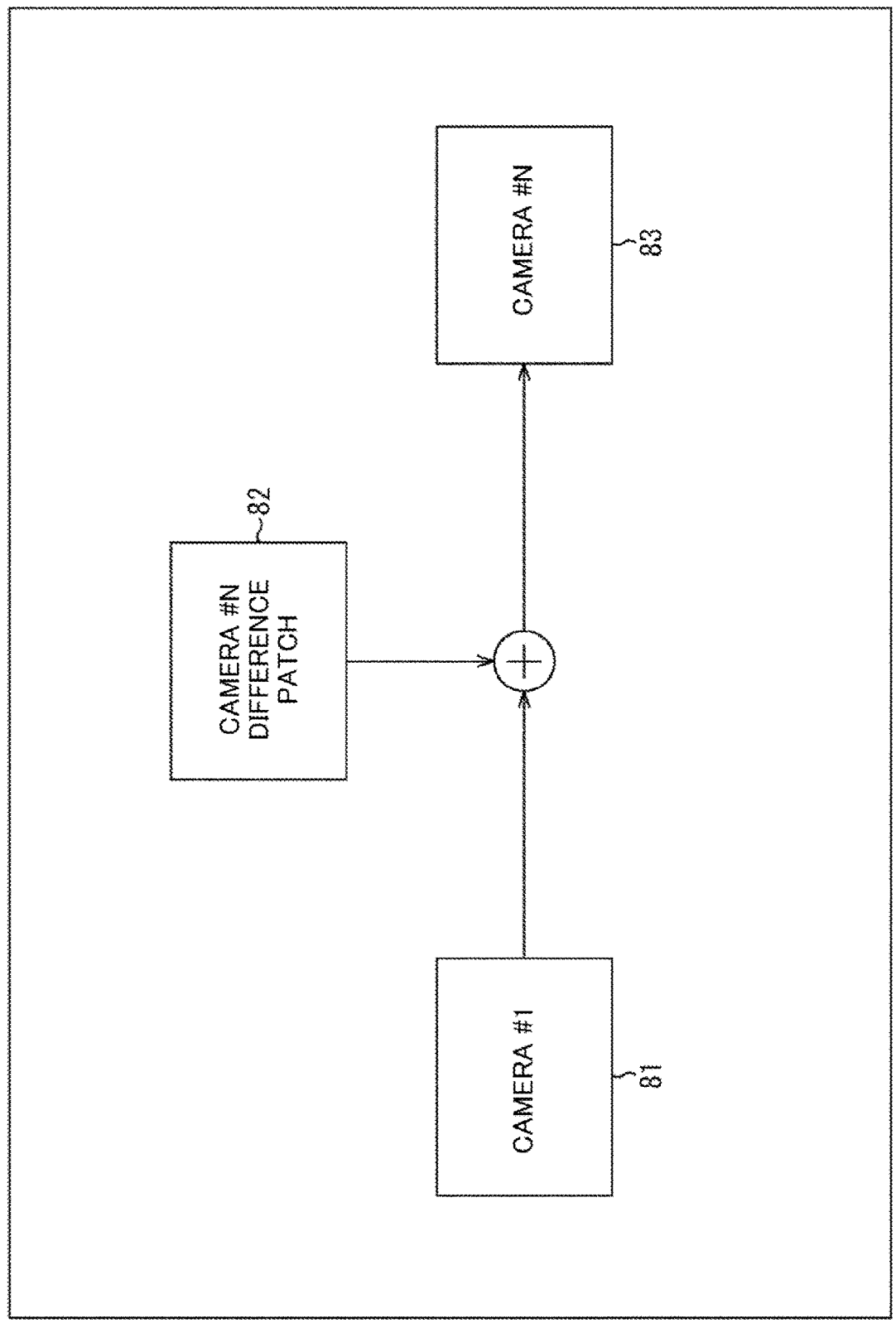
FIG. 8 is a diagram illustrating an example of additional patch.

For example, a difference patch 82 for camera #N may be added to a patch 81 for camera #1 so that a patch 83 of camera #N is generated, as illustrated in FIG. 8.

By doing so, it is possible to encode (transmit) the difference patch 82 instead of the patch 83 of camera #N. It is possible to suppress an increase in amount of code (typically, to reduce the amount of code) by generating the difference patch 82 so that the amount of information is smaller than that of the patch 83.

Only some components may be encoded (transmitted) as the additional patch. For example, only the luminance component (Luma) may be encoded (transmitted) as the additional patch. By encoding (transmitting) the additional patch (an additional Luma patch) of only the luminance component in this way, it is possible to further suppress an increase in amount of code. When the additional patch is encoded (transmitted) in this way, a camera ID may be added to the patch information to indicate which camera each patch has additional patch for.

Figure 9:
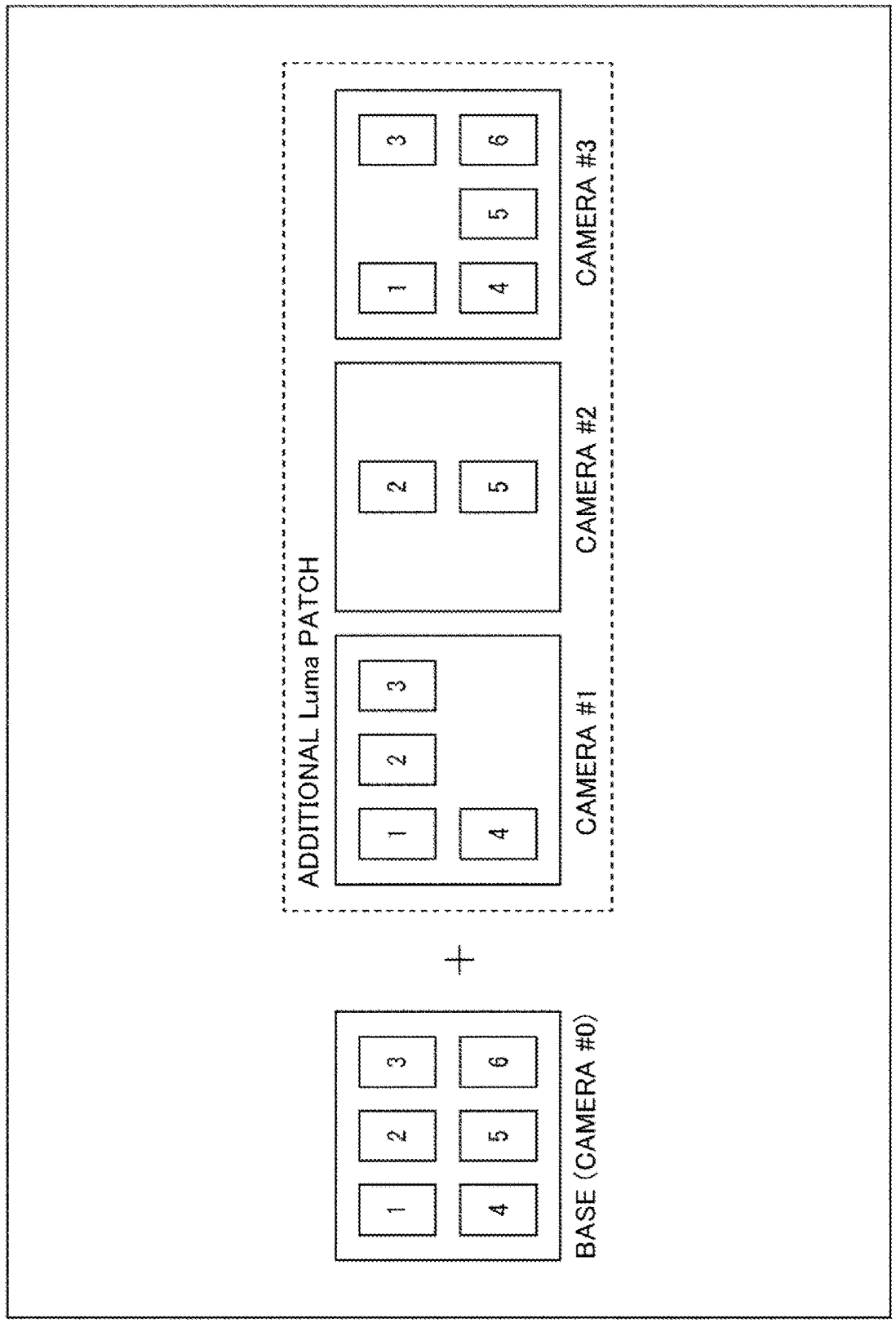
FIG. 9 is a diagram illustrating an example of an additional Luma patch.

Further, for example, as illustrated in FIG. 9, the additional Luma patch added to the base attribute patch may be encoded (transmitted). The additional Luma patch may be a difference patch with respect to the base attribute patch, or may be a patch that replaces the base attribute patch.

Any encoding (transmission) method for the additional Luma patch may be used. For example, an encoding scheme for an image may be used to encode the additional Luma patch. In this case, a format may be YUV400 or may be YUV420 or YUV444 with Cb and Cr set to 0. Further, for example, run-length encoding may be used to encode the additional Luma patch.

<Combination>

Figure 10:
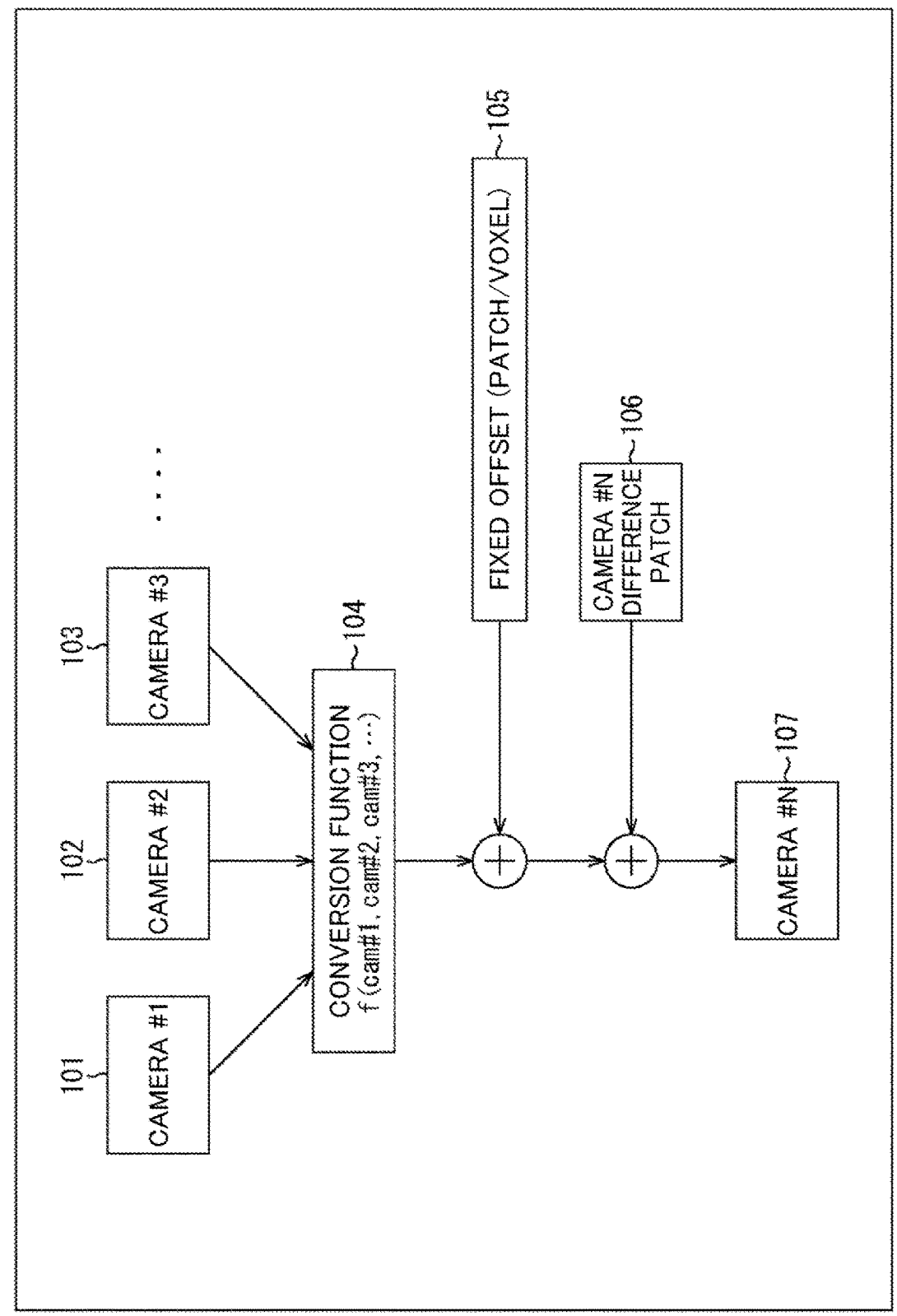
FIG. 10 is a diagram illustrating an example of a combination of patch generation methods.

The various methods described above can be applied in any combination. For example, as illustrated in FIG. 10, conversion 104 using a conversion function f( ) may be performed on a patch 101 of camera #1, a patch 102 of camera #2, a patch 103 of camera #3, . . . , a fixed offset 105 such as the patch offset or the voxel offset may be added to a result of the conversion, and a difference patch 106 of camera #N may be further added to the result to generate a patch 107 of camera #N.

Further, conversion using the conversion function f( ) is performed on one camera (attribute), and the fixed offset or additional patch may be added to a result of the conversion.

Further, the fixed offset such as the patch offset or the voxel offset may be added to the base attribute patch, and an additional patch (difference patch) may be added to a result thereof. By applying the fixed offset, it is possible to uniformly change attributes of a plurality of points. By adding the additional patch, it is possible to perform finer control on each voxel.

Further, none of the conversion function, the fixed offset, and the additional patch may be applied. In this case, the patch of the other camera (attribute) is duplicated and a patch of a desired camera (attribute) is generated. For example, when the patch of the base attribute is a reference destination, the base attribute patch is duplicated and a desired attribute patch is generated.

<Patch Generation Method Designation Information>

As described above, when a plurality of methods can be applied to patch generation, patch generation method designation information for designating a patch generation method may be used. That is, this patch generation method designation information is signaled. By doing so, the decoding side can easily ascertain the applied patch generation method on the basis of the signaled patch generation method designation information.

For example, the patch generation method designation information for designating a patch generation method to be applied in the patch generation processing may be signaled as a patch generation parameter. In other words, the patch generation method designation information may be included in the patch generation parameter. Further, the processing for generating a patch by referring to the other attribute using the generation method designated by the patch generation method designation information may be included in the patch generation processing.

Flag information (FLAG) indicating whether or not each scheme of the patch offset, the voxel offset, and the conversion function is to be applied may be used as the patch generation method designation information, for example, as shown in the table of FIG. 11. This flag information (FLAG) is 3-bit flag information indicating, using one bit, whether the patch offset, the voxel offset, and the conversion function is to be applied. By signaling such flag information (FLAG), it is possible for the decoding side to easily ascertain the scheme to be applied (or the scheme to be combined).

Of course, the patch generation method designation information is not limited to this example, and may be any information. For example, 1-bit flag information (flag) indicating whether or not at least one of the patch offset, the voxel offset, and the conversion function is to be applied may be further applied. That is, this flag information (flag) may always be signaled, or the flag information (FLAG) may be signaled only when the flag information (flag) is true. When the flag information (flag) is false, duplication of another patch is applied. By doing so, when the other patch is often duplicated, it is possible to reduce a data amount of the patch generation method designation information, and thus, to suppress an increase in amount of code.

<Example of Patch Generation Parameter>

Examples of the signaled patch generation parameter are illustrated in FIG. 12. As shown in the table illustrated in FIG. 12, reference designation information (a reference camera ID) for designating an attribute serving as a reference destination, patch generation method designation information (conversion FLAG) for designating the patch generation method to be applied in the patch generation processing, and other conversion information are signaled as the patch generation parameter for each patch (patch ID) generated by referring to the other patch.

For example, in the patch generation processing, the reference designation information for designating the attribute serving as the reference destination may be signaled as the patch generation parameter. That is, as in the example of FIG. 12, this reference designation information may be included in the patch generation parameter. Further, the processing for generating a patch by referring to the other attribute designated by the reference destination designation information may be included in the patch generation processing.

The other conversion information may include any information on the patch generation processing. For example, the other conversion information may include information such as the patch offset (Patch Offset), the voxel offset (VoxelOffset), and the voxel designation information (Voxel ID) for an application destination. The other conversion information may also include conversion method designation information (conversion designation param) for designating a conversion method for patch of the other attribute performed in the patch generation processing.

A patch for which the patch generation parameter as described above is not signaled (for example, a patch with a patch ID=3) is transmitted as a patch that can be decoded without referring to the other patches (also called a base patch). That is, the patch is packed in the attribute video frame and transmitted.

Further, a patch with conversion FLAG=000 (for example, a patch with ID=6) is generated by duplicating the patch of the attribute that is a reference destination.

When the base attribute different from each camera can be the reference destination, an ID different from those of the other attributes is assigned to the base attribute. When the same base (a fixed camera, average, or the like) is used in all the cameras, the reference camera ID may be omitted in the patch generation parameter described above through at least one transmission. Further, when the same camera is used in many patches, only a part with reference camera ID different from other IDs may be transmitted.

<Reference Structure>

Figure 13:
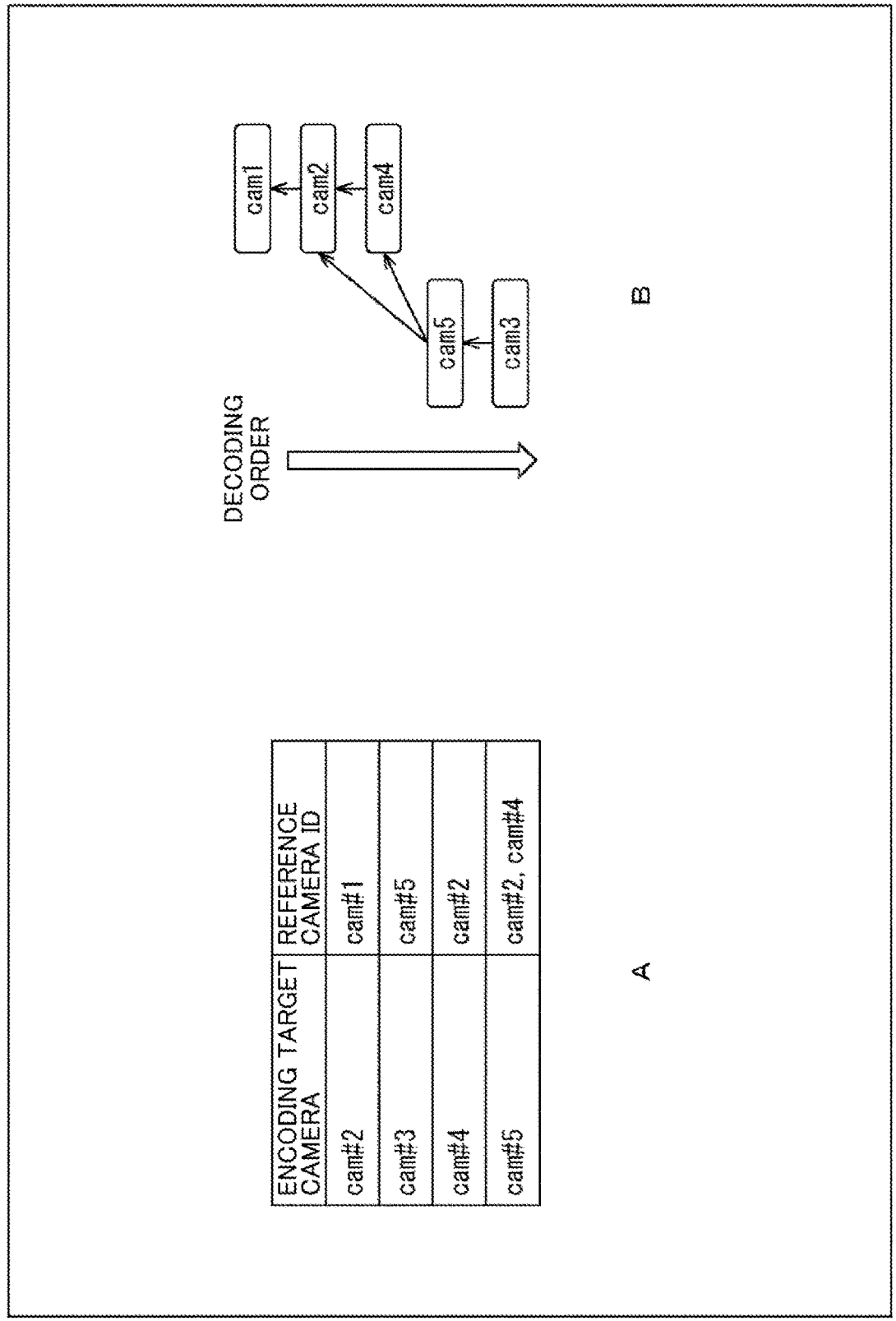
FIG. 13 is a diagram illustrating an example of a reference structure.

When the patch generation parameter as shown in the table of FIG. 12 is signaled, the decoder collects the reference destination designation information (the reference camera ID) from the patch generation parameters of all the cameras for each patch, and constructs a reference structure. For example, the decoder can construct the reference structure as illustrated in B of FIG. 13 on the basis of the reference destination designation information as shown in the table of A of FIG. 13, which has been signaled for a certain patch. The decoder can perform decoding processing more efficiently by setting decoding order of the patches of the respective cameras (attributes) according to such a reference structure.

2. First Embodiment

<Encoding Device>

Figure 14:
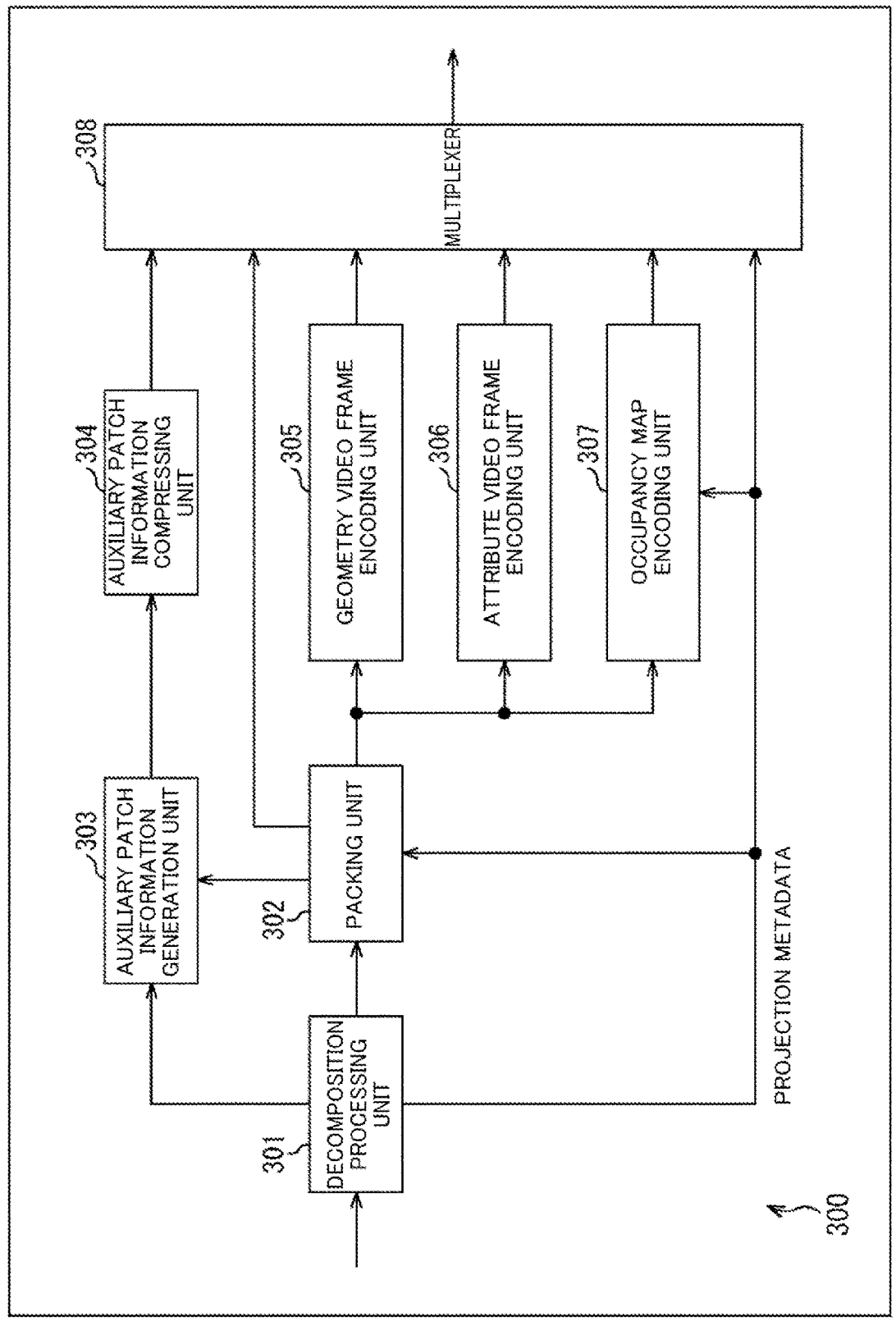
FIG. 14 is a block diagram illustrating a main configuration example of an encoding device.

FIG. 14 is a block diagram illustrating an example of a configuration of an encoding device that is an embodiment of an image processing device to which the present technology is applied. The encoding device 300 illustrated in FIG. 14 is a device that applies a video-based approach and encodes point cloud data as a video frame using an encoding method for a two-dimensional image. Further, the encoding device 300 may associate a plurality of attributes with one piece of geometry, like the multi-attribute.

In FIG. 14, main components such as processing units or data flows are illustrated, and the components illustrated in FIG. 14 are not all components. That is, in the encoding device 300, there may be processing units not illustrated as blocks in FIG. 14, or there may be processing or data flows not indicated by arrows or the like in FIG. 14.

As illustrated in FIG. 14, the encoding device 300 includes a decomposition processing unit 301, a packing unit 302, an auxiliary patch information generation unit 303, an auxiliary patch information compression unit 304, a geometry video frame encoding unit 305, an attribute video frame encoding unit 306, an occupancy map encoding unit 307, and a multiplexer 308.

The decomposition processing unit 301 performs processing regarding decomposition of the geometry data. For example, the decomposition processing unit 301 acquires a point cloud that is input to the encoding device 300.

Further, the decomposition processing unit 301 decomposes the acquired point cloud into patches to generate a geometry patch or a patch of the attribute. The decomposition processing unit 301 supplies these patches to the packing unit 302.

Further, the decomposition processing unit 301 supplies information on the generated patch (for example, patch ID or position information) to the auxiliary patch information generation unit 303. Further, the decomposition processing unit 301 generates projection metadata, which is information on a viewpoint, as necessary, and supplies the projection metadata to the packing unit 302, the occupancy map encoding unit 307, and the multiplexer 308.

The packing unit 302 performs processing regarding packing. For example, the packing unit 302 acquires the patch of the geometry or attribute supplied from the decomposition processing unit 301. The packing unit 302 packs the acquired patch of the geometry into a video frame to generate the geometry video frame.

The packing unit 302 supplies the generated the geometry video frame to the geometry video frame encoding unit 305.

Further, the packing unit 302 packs the acquired patch of the attribute into a video frame for each attribute to generate an attribute video frame. For example, the packing unit 302 generates the attribute video frame for each attribute. The packing unit 302 supplies the generated attribute video frame to the attribute video frame encoding unit 306.

Further, the packing unit 302 generates an occupancy map on the basis of the generated the geometry video frame. The packing unit 302 uses the generated occupancy map as a video frame and supplies the occupancy map to the occupancy map encoding unit 307.

Further, the packing unit 302 supplies information on packing to the auxiliary patch information generation unit 303. For example, the packing unit 302 supplies the position (u0, v0) of the patch and the like on the two-dimensional plane of the patch to the auxiliary patch information generation unit 303 as the information on packing.

The auxiliary patch information generation unit 303 performs processing regarding generation of the auxiliary patch information. For example, the auxiliary patch information generation unit 303 acquires various types of information supplied from the decomposition processing unit 301 or the packing unit 302. The auxiliary patch information generation unit 303 generates the auxiliary patch information including such information. That is, this the auxiliary patch information includes the conversion information (patch generation parameter). The auxiliary patch information generation unit 303 supplies the generated the auxiliary patch information to the auxiliary patch information compression unit 304.

The auxiliary patch information compression unit 304 performs processing regarding compression of the auxiliary patch information. For example, the auxiliary patch information compression unit 304 acquires the auxiliary patch information supplied from the auxiliary patch information generation unit 303.

The auxiliary patch information compression unit 304 encodes (compresses) the acquired the auxiliary patch information. That is, the auxiliary patch information compression unit 304 encodes (compresses) the conversion information (patch generation parameter). Any encoding method is used. For example, an encoding method for a two-dimensional image may be applied, or run-length encoding or the like may be applied. The auxiliary patch information compression unit 304 supplies the obtained encoded data of the auxiliary patch information to the multiplexer 308.

The geometry video frame encoding unit 305 performs processing regarding encoding of the geometry video frame. For example, the geometry video frame encoding unit 305 acquires the geometry video frame that is supplied from the packing unit 302. Further, the geometry video frame encoding unit 305 encodes the acquired geometry video frame using any encoding method for a two-dimensional image such as advanced video coding (AVC) or high efficiency video coding (HEVC) to generate encoded data for the geometry video frame. The geometry video frame encoding unit 305 supplies the encoded data of the geometry video frame to the multiplexer 308.

The attribute video frame encoding unit 306 performs processing regarding encoding of the attribute video frame. For example, the attribute video frame encoding unit 306 acquires the attribute video frame supplied from the packing unit 302. Further, the attribute video frame encoding unit 306 encodes the acquired attribute video frame using any encoding method for a two-dimensional image such as AVC or HEVC.

A patch to be transmitted to the decoding side is packed in this attribute video frame. That is, a patch generated without referring to the other attribute on the decoding side is packed. For example, a base patch is packed. That is, the attribute video frame encoding unit 306 encodes an attribute video frame in which the patch of the attribute for which the patch generation parameter has not been derived has been arranged. In other words, the attribute video frame encoding unit 306 encodes an attribute video frame in which patches of attributes different from some attributes of which patches are generated by the patch generation processing among the plurality of attributes constituting the multi-attribute are arranged, and omit the encoding of the attribute video frame in which patches representing some attributes are arranged. The attribute video frame encoding unit 306 supplies the encoded data of the attribute video frame obtained by the encoding to the multiplexer 308.

The occupancy map encoding unit 307 performs processing regarding encoding of a video frame of the occupancy map. For example, the occupancy map encoding unit 307 acquires the occupancy map supplied from the packing unit 302. Further, the occupancy map encoding unit 307 encodes the acquired occupancy map using, for example, any encoding method for a two-dimensional image. The occupancy map encoding unit 307 supplies the encoded data of the occupancy map obtained by the encoding to the multiplexer 308.

The multiplexer 308 performs processing regarding multiplexing. For example, the multiplexer 308 acquires the encoded data of the auxiliary patch information supplied from the auxiliary patch information compression unit 304. Further, the multiplexer 308 acquires the encoded geometry data supplied from the geometry video frame encoding unit 305. Further, the multiplexer 308 acquires the encoded attribute data supplied from the attribute video frame encoding unit 306. Further, the multiplexer 308 acquires the encoded data of the occupancy map supplied from the occupancy map encoding unit 307.

The multiplexer 308 multiplexes the acquired information to generate a bitstream. The multiplexer 308 outputs the generated bitstream to the outside of encoding device 300.

These processing units (the decomposition processing unit 301 to the multiplexer 308) have any configurations. For example, each processing unit may be configured of a logic circuit that realizes the above processing. Further, each processing unit may include, for example, a central processing unit (CPU), a read only memory (ROM), and a random access memory (RAM), and realize the above-described processing by executing a program using these. Of course, each processing unit may have both the configurations, realize some of the above-described processes using a logic circuit, and realize others by executing a program. The configurations of the respective processing units may be independent of each other, and for example, some of the processing units may realize some of the above processing using a logic circuit, other processing units may realize the above-described processing by executing a program, and yet other processing units may realize the above-described processing using both the logic circuit and the execution of the program.

<Decomposition Processing Unit>

Figure 15:
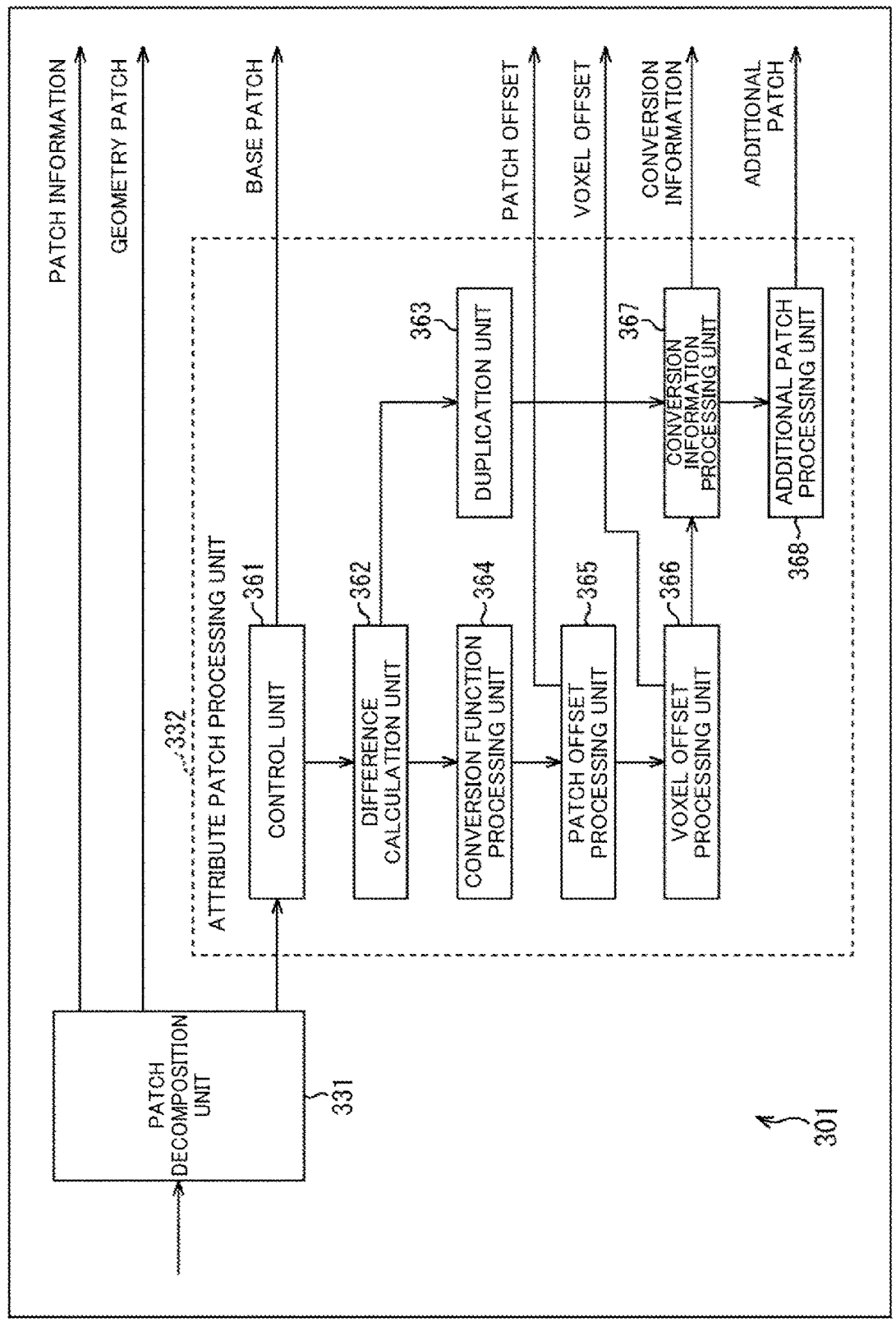
FIG. 15 is a block diagram illustrating a main configuration example of a decomposition processing unit.

FIG. 15 is a block diagram illustrating a main configuration example of the decomposition processing unit 301 of FIG. 14. As illustrated in FIG. 15, the decomposition processing unit 301 includes a patch decomposition unit 331 and an attribute patch processing unit 332. The patch decomposition unit 331 decomposes the geometry and attribute of the input point cloud into patches. The patch decomposition unit 331 supplies the obtained geometry patches to the packing unit 302. Further, the patch decomposition unit 331 supplies the attribute patch, which is the obtained patch of the attribute, to the attribute patch processing unit 332. Further, the patch decomposition unit 331 supplies patch information, which is information on these patches, to the auxiliary patch information generation unit 303.

The attribute patch processing unit 332 acquires the attribute patch supplied from the patch decomposition unit 331 and performs processing on the attribute patch.

As illustrated in FIG. 15, the attribute patch processing unit 332 includes a control unit 361, a difference calculation unit 362, a duplication unit 363, a conversion function processing unit 364, a patch offset processing unit 365, a voxel offset processing unit 366, a conversion information processing unit 367, and an additional patch processing unit 368.

The control unit 361 controls processing for attribute patches. For example, when the patch serving as a processing target is the base patch that does not refer to the other patches, the control unit 361 supplies the base patch to the difference calculation unit 362 and the attribute video frame encoding unit 306.

Further, when the patch serving as the processing target is not the base patch, the control unit 361 supplies the patch to the difference calculation unit 362.

The difference calculation unit 362 calculates an attribute difference between the cameras, and supplies data to the duplication unit 363 or the conversion function processing unit 364 according to a processing result. The duplication unit 363 performs processing for duplicating other patches, and supplies a result of the processing to the conversion information processing unit 367. The conversion function processing unit 364 performs patch conversion processing using the conversion function, and supplies a result of the processing to the patch offset processing unit 365.

The patch offset processing unit 365 performs processing for adding the patch offset to the patch, and supplies a result of the processing to the voxel offset processing unit 366. The patch offset processing unit 365 also supplies the patch offset to the auxiliary patch information generation unit 303. The voxel offset processing unit 366 performs processing for adding the voxel offset to the patch, and supplies a result of the processing to the conversion information processing unit 367. The voxel offset processing unit 366 also supplies the voxel offset to the auxiliary patch information generation unit 303.

The conversion information processing unit 367 performs processing regarding derivation of the conversion information (patch generation parameter) and supplies the derived the conversion information (patch generation parameter) to the auxiliary patch information generation unit 303. The additional patch processing unit 368 generates an additional patch and supplies the additional patch to the packing unit 302.

<Encoding Processing Flow>

Figure 16:
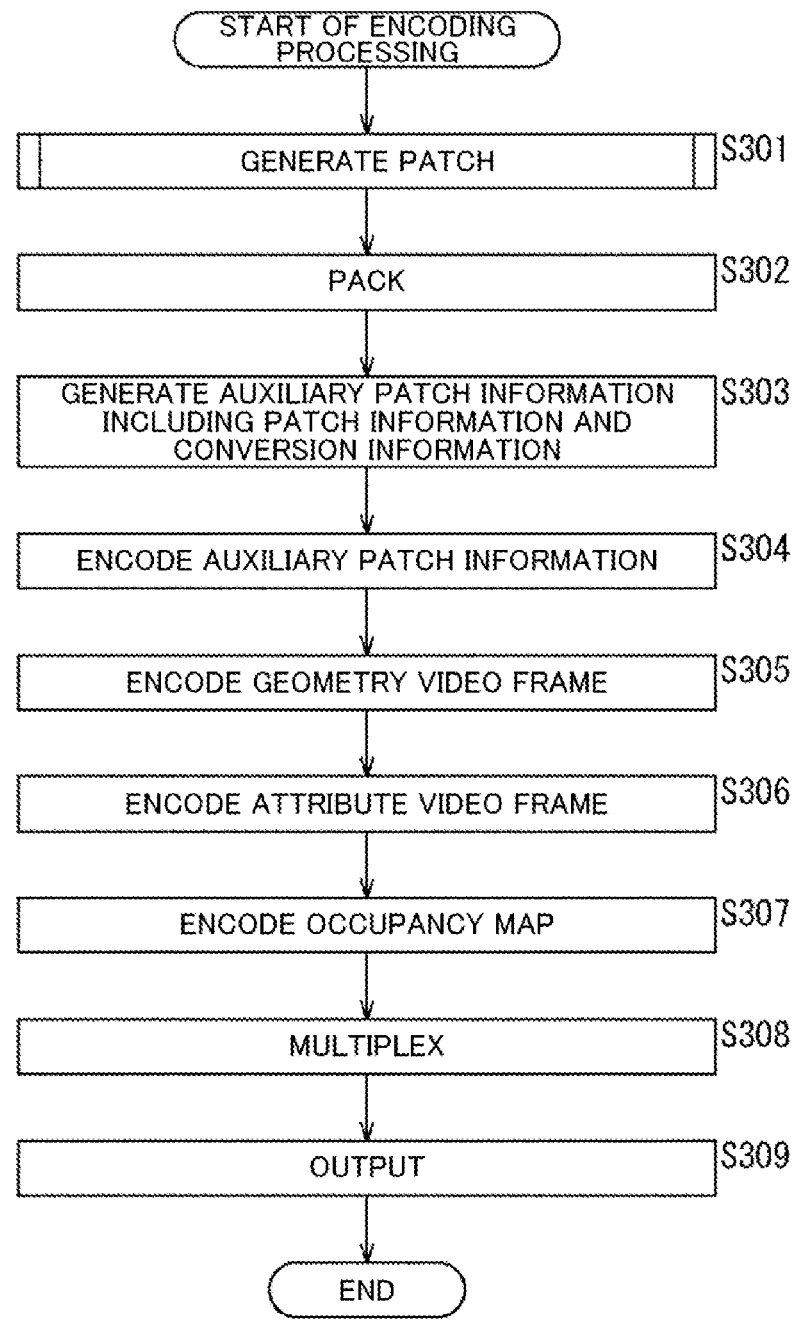
FIG. 16 is a flowchart illustrating an example of a flow of encoding processing.

An example of a flow of encoding processing executed by the encoding device 300 will be described with reference to the flowchart of FIG. 16.

When the encoding processing is started, the decomposition processing unit 301 of the encoding device 300 decomposes the point cloud into patches to generate the patch of the geometry or attribute in step S301.

In step S302, the packing unit 302 packs the patch generated in step S302 into a video frame. For example, the packing unit 302 packs the patch of the geometry to generate the geometry video frame. Further, the packing unit 302 packs the patch of each attribute to generate an attribute video frame for each attribute. Further, the packing unit 302 generates an occupancy map on the basis of the generated the geometry video frame.

In step S303, the auxiliary patch information generation unit 303 generates the auxiliary patch information including the patch information, the above-described conversion information (patch generation parameter), the information on packing, and the like.

In step S304, the auxiliary patch information compression unit 304 encodes the auxiliary patch information generated in step S303 using a predetermined encoding method. The auxiliary patch information includes the conversion information (patch generation parameter) described above. That is, the auxiliary patch information compression unit 304 encodes (compresses) the conversion information (patch generation parameter).

In step S305, the geometry video frame encoding unit 305 encodes the geometry video frame obtained by the processing of step S302 using the encoding method for a two-dimensional image.

In step S306, the attribute video frame encoding unit 306 encodes the attribute video frame obtained by the processing of step S302 using the encoding method for a two-dimensional image. A patch to be transmitted to the decoding side is packed in this attribute video frame. That is, a patch generated without referring to the other attribute on the decoding side is packed. For example, a base patch is packed. That is, the attribute video frame encoding unit 306 encodes an attribute video frame in which the patch of the attribute for which the patch generation parameter has not been derived has been arranged.

In step S307, the occupancy map encoding unit 307 encodes the occupancy map obtained by the processing of step S302 using the encoding method for a two-dimensional image.

In step S308, the multiplexer 308 multiplexes the various types of information generated as described above to generate a bitstream including this information.

In step S309, the multiplexer 308 outputs the bitstream generated by the processing of step S308 to the outside of the encoding device 300. When the processing of step S309 ends, the encoding processing ends.

<Flow of Patch Generation Processing>

Figure 17:
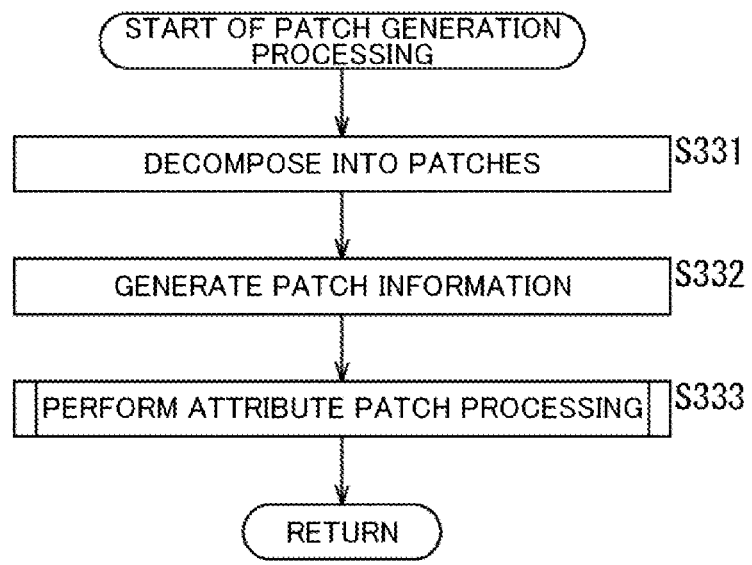
FIG. 17 is a flowchart illustrating an example of a flow of patch generation processing.

An example of a flow of the patch generation processing executed in step S301 of FIG. 16 will be described with reference to the flowchart of FIG. 17.

When the patch generation processing is started, the patch decomposition unit 331 decomposes the point cloud into patches to generate a geometry patch and attribute patch in step S331. Further, in step S332, the patch decomposition unit 331 generates patch information on the generated patch.

In step S333, the attribute patch processing unit 332 performs attribute patch processing. When the processing of step S333 ends, the patch generation processing ends, and the processing returns to FIG. 16.

<Flow of Attribute Patch Processing>

An example of a flow of the attribute patch processing executed in step S333 of FIG. 17 will be described with reference to flowcharts of FIGS. 18 and 19.

Figure 18:
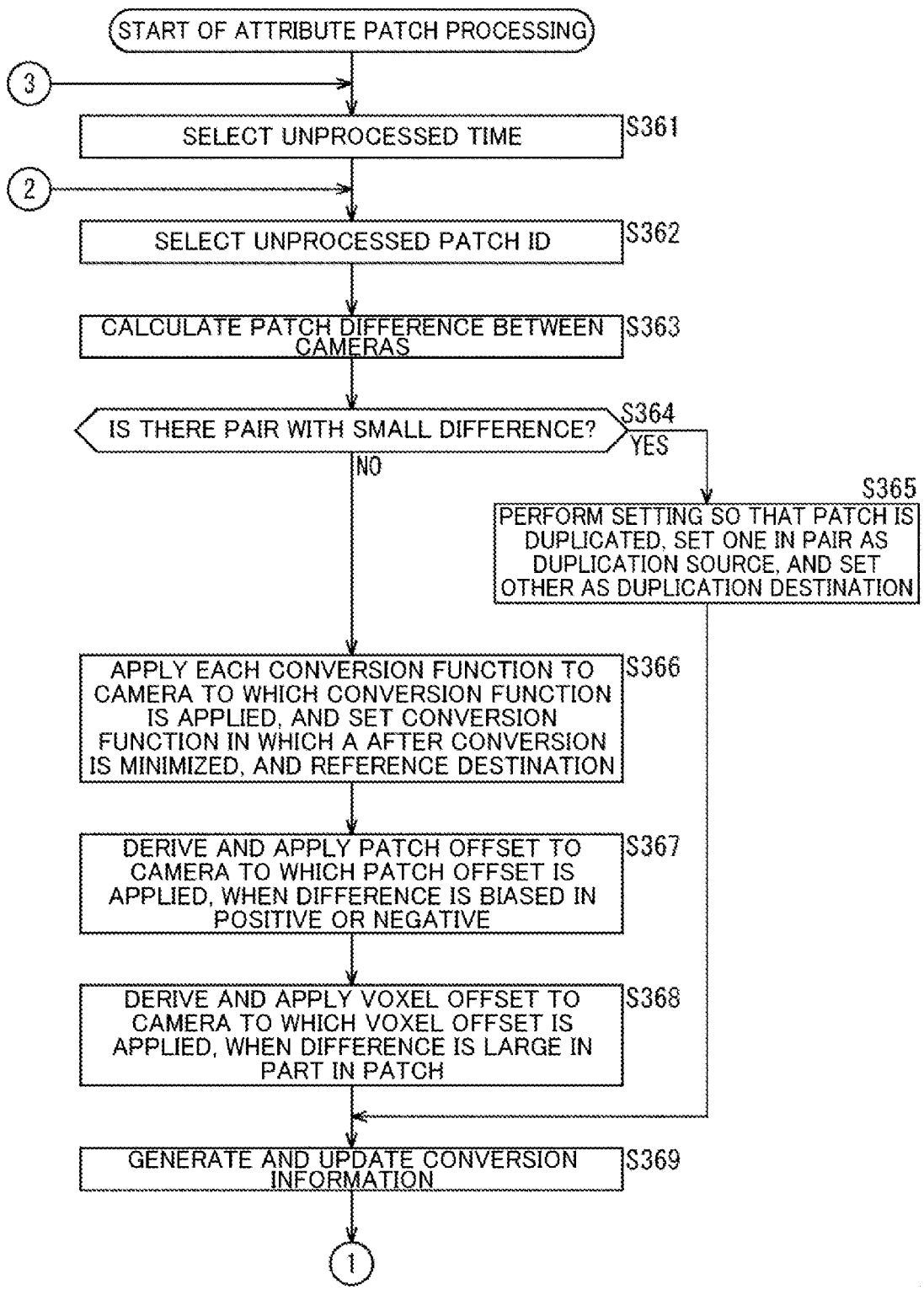
FIG. 18 is a flowchart illustrating an example of a flow of attribute patch processing.

When the attribute patch processing is started, the control unit 361 selects an unprocessed time t as a processing target in step S361 of FIG. 18. Further, in step S362, the control unit 361 selects an unprocessed patch ID. Further, in step S363, the difference calculation unit 362 calculates the patch difference between the cameras. The difference calculation unit 362 determines whether or not there is a pair with a sufficiently small difference in step S364. When there is the pair, the processing proceeds to step S365.

In step S365, the duplication unit 363 performs a setting so that the patch is duplicated, sets one in the pair as a duplication source, and sets the other as a duplication destination. When the processing of step S365 ends, the processing proceeds to step S369. When a determination is made in step S364 that there is no pair with a sufficiently small difference, the processing proceeds to step S366.

In step S366, the conversion function processing unit 364 applies each conversion function to a camera to which the conversion function can be applied, and sets the conversion function in which a difference after conversion is minimized, and the reference destination.

In step S367, the patch offset processing unit 365 derives and applies a patch offset to a camera to which the patch offset can be applied, when the difference is biased in positive or negative.

In step S368, the voxel offset processing unit 366 derives and applies the voxel offset to a camera to which the voxel offset can be applied, when the difference is sufficiently large in a part in the patch. When the processing of step S368 ends, the processing proceeds to step S369.

In step S369, the conversion information processing unit 367 generates the conversion information (patch generation parameter) on the basis of results of these processing. When the conversion information (patch generation parameter) has already been present, the conversion information processing unit 367 updates the conversion information (patch generation parameter) on the basis of the results of these processing. When the processing of step S369 ends, the processing proceeds to FIG. 19.

Figure 19:
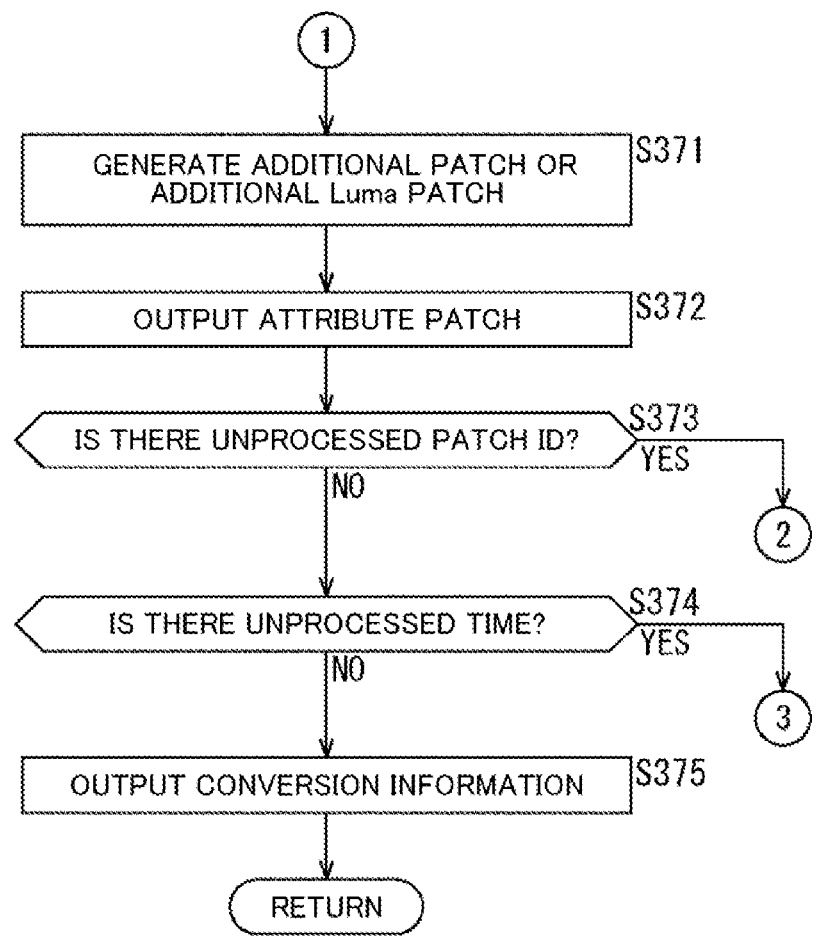
FIG. 19 is a flowchart following FIG. 18 illustrating an example of the flow of the attribute patch processing.

In step S371 of FIG. 19, the additional patch processing unit 368 generates an additional patch or additional Luma patch.

In step S372, the control unit 361 outputs the base patch to the packing unit 302 as the attribute patch. Further, the additional patch processing unit 368 outputs the additional patch to the packing unit 302 as the attribute patch.

In step S373, the control unit 361 determines whether or not there is the unprocessed patch ID. When a determination is made that there is an unprocessed patch ID, the processing returns to step S362 in FIG. 18, and the processing target is updated to the next unprocessed patch ID. That is, each processing of steps S362 to S369 in FIG. 18 and each processing of steps S371 to S373 in FIG. 19 are executed for each patch ID.

When a determination is made in step S373 that there is no unprocessed patch ID (all patch IDs have been processed), the processing proceeds to step S374.

In step S374, the control unit 361 determines whether or not there is an unprocessed time. When a determination is made that there is the unprocessed time, the processing returns to step S361 of FIG. 18, and the processing target is updated to the next unprocessed time. That is, each processing from step S361 to step S369 in FIG. 18 and each processing from step S371 to step S374 in FIG. 19 are executed for each time.

When a determination is made in step S374 that there is no unprocessed time (all times have been processed), the processing proceeds to step S375.

In step S375, the conversion information processing unit 375 outputs the conversion information (patch generation parameter) to the auxiliary patch information generation unit 303. When the processing of step S375 ends, the attribute patch processing ends and the processing returns to FIG. 17.

By executing each processing as described above, the encoding device 300 can suppress an increase in amount of code, as described above in <1. Patch Generation in Which Other Attribute is Referred to>. Accordingly, the encoding device 300 can suppress an increase in a load of the encoding processing. Further, the encoding device 300 can suppress an increase in a load of the decoding processing. Further, the encoding device 300 can suppress an increase in load (such as a load of a transmission medium or a storage medium) when encoded data is transmitted or stored. Further, the encoding device 300 can suppress an increase in costs of devices or systems regarding the video-based approach, such as the encoding device 300 itself and a decoding device 400 to be described below.

3. Second Embodiment

<Decoding Device>

Figure 20:
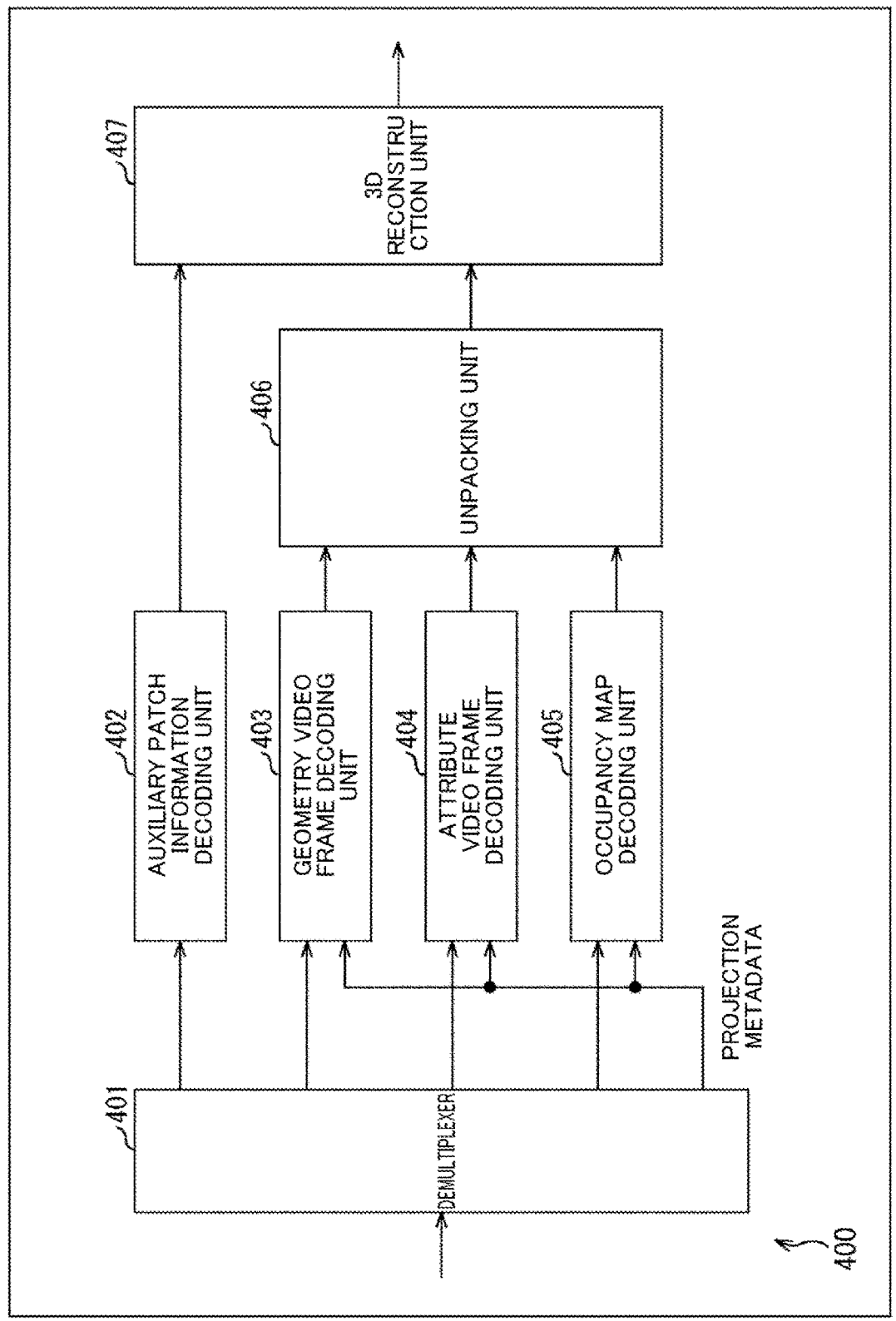
FIG. 20 is a block diagram illustrating a main configuration example of a decoding device.

FIG. 20 is a block diagram illustrating an example of a configuration of a decoding device that is an aspect of the image processing device to which the present technology is applied. The decoding device 400 illustrated in FIG. 20 is a device that applies the video-based approach and decodes the encoded data encoded by using the encoding method for a two-dimensional image with the point cloud data as the video frame, using a decoding method for a two-dimensional image to generate (reconstruct) a point cloud.

In FIG. 20, main components such as processing units or data flows are illustrated, and the components illustrated in FIG. 20 are not all components. That is, in the decoding device 400, there may be processing units not illustrated as blocks in FIG. 20, or there may be processing or data flows not indicated by arrows or the like in FIG. 15.

As illustrated in FIG. 20, the decoding device 400 includes a demultiplexer 401, an auxiliary patch information decoding unit 402, a geometry video frame decoding unit 403, an attribute video frame decoding unit 404, an occupancy map decoding unit 405, an unpacking unit 406, and a 3D reconstruction unit 407.

The demultiplexer 401 performs processing regarding data demultiplexing. For example, the demultiplexer 401 acquires the bitstream input to the decoding device 400. This bitstream is generated, for example, by the encoding device 300 encoding the point cloud data.

Further, the demultiplexer 401 demultiplex this bitstream. For example, the demultiplexer 401 extracts the encoded data of the auxiliary patch information from the bitstream through demultiplexing. The demultiplexer 401 supplies the extracted encoded data of the auxiliary patch information to the auxiliary patch information decoding unit 402.

Further, the demultiplexer 401 extracts the encoded data of the geometry video frame from the bitstream through demultiplexing. The demultiplexer 401 supplies the extracted the encoded data of the geometry video frame to the geometry video frame decoding unit 403.

Further, the demultiplexer 401 extracts the encoded data of the attribute video frame from the bitstream through demultiplexing. The demultiplexer 401 supplies the extracted encoded data of the attribute video frame to the attribute video frame decoding unit 404.

Further, the demultiplexer 401 extracts the encoded data of the occupancy map from the bitstream through demultiplexing. The demultiplexer 401 supplies the extracted encoded data of the occupancy map to the occupancy map decoding unit 405.

Further, the demultiplexer 401 may supply projection metadata signaled from the encoding side to the geometry video frame decoding unit 403, the attribute video frame decoding unit 404, and the occupancy map decoding unit 405.

The auxiliary patch information decoding unit 402 performs processing regarding decoding of the encoded data of the auxiliary patch information. For example, the auxiliary patch information decoding unit 402 acquires the encoded data of the auxiliary patch information supplied from the demultiplexer 401. Further, the auxiliary patch information decoding unit 402 decodes the encoded data to generate the auxiliary patch information. This auxiliary patch information includes the conversion information (patch generation parameter). That is, the auxiliary patch information decoding unit 402 decodes the encoded data to generate the conversion information (patch generation parameter). Any decoding method may be used as long as the method is a method (a decoding method not for a two-dimensional image) corresponding to an encoding method applied at the time of encoding (for example, an encoding method applied by the auxiliary patch information compression unit 304). Further, the auxiliary patch information decoding unit 402 supplies the auxiliary patch information to the 3D reconstruction unit 407.

The geometry video frame decoding unit 403 performs processing regarding decoding of the encoded data of the geometry video frame. For example, the geometry video frame decoding unit 403 acquires the encoded data of the geometry video frame supplied from the demultiplexer 401. Further, the geometry video frame decoding unit 403 decodes the encoded data to generate the geometry video frame. Further, the geometry video frame decoding unit 403 can supply the geometry video frame to the unpacking unit 406.

The attribute video frame decoding unit 404 performs processing regarding decoding of the encoded data of the attribute video frame. For example, the attribute video frame decoding unit 404 acquires the encoded data of the attribute video frame supplied from the demultiplexer 401. Further, the attribute video frame decoding unit 404 decodes the encoded data to generate the attribute video frame. The attribute video frame decoding unit 404 supplies the attribute video frame to the unpacking unit 406.

The occupancy map decoding unit 405 performs processing regarding decoding of the encoded data of the occupancy map. For example, the occupancy map decoding unit 405 acquires the encoded data of the occupancy map supplied from the demultiplexer 401. Further, the occupancy map decoding unit 405 decodes the encoded data to generate an occupancy map. Further, the occupancy map decoding unit 415 supplies the occupancy map to the unpacking unit 406.

The unpacking unit 406 performs processing regarding unpacking. For example, the unpacking unit 406 acquires the geometry video frame supplied from the geometry video frame decoding unit 403. Further, the unpacking unit 406 acquires the attribute video frame supplied from the attribute video frame decoding unit 404. Further, the unpacking unit 406 acquires the occupancy map supplied from the occupancy map decoding unit 405.

Further, the unpacking unit 406 unpacks the geometry video frame and each attribute video frame on the basis of the occupancy map to generate a patch. Further, the unpacking unit 406 supplies, for example, the generated patch of the geometry or attribute to the 3D reconstruction unit 407.

The 3D reconstruction unit 407 performs processing regarding generation (reconstruction) of a point cloud (3D data). For example, the 3D reconstruction unit 407 acquires the auxiliary patch information supplied from the auxiliary patch information decoding unit 402. The 3D reconstruction unit 407 also acquires, for example, the patch of the geometry or attribute supplied from the unpacking unit 406. The 3D reconstruction unit 407 uses the information to generate (reconstruct) a point cloud. In this case, the 3D reconstruction unit 407 performs <1. Patch Generation in Which Other Attribute is Referred to>.

For example, the 3D reconstruction unit 407 performs patch generation processing using the conversion information (patch generation parameter) included in the auxiliary patch information to generate attribute patches that have not been transmitted. By appropriately interpolating the attribute patches in this way, the 3D reconstruction unit 407 can correctly generate (reconstruct) the point cloud using, for example, the auxiliary patch information and the patch of the geometry or attribute.

The 3D reconstruction unit 407 outputs the point cloud data obtained by such processing to the outside of the decoding device 400. This point cloud data is, for example, rendered and displayed on a display unit, recorded on a recording medium, or supplied to another device through communication.

These processing units (the demultiplexer 401 to the 3D reconstruction unit 407) have any configurations. For example, each processing unit may be configured by a logic circuit that realizes the above processing. Further, each processing unit may include, for example, a CPU, a ROM, and a RAM, and realize the above-described processing by executing a program using these. Of course, each processing unit may have both the configurations, realize some of the above-described processes using a logic circuit, and realize others by executing a program. The configurations of the respective processing units may be independent of each other, and for example, some of the processing units may realize some of the above processing using a logic circuit, other processing units may realize the above-described processing by executing a program, and yet other processing units may realize the above-described processing using both the logic circuit and the execution of the program.

<3D Reconstruction Unit>

Figure 21:
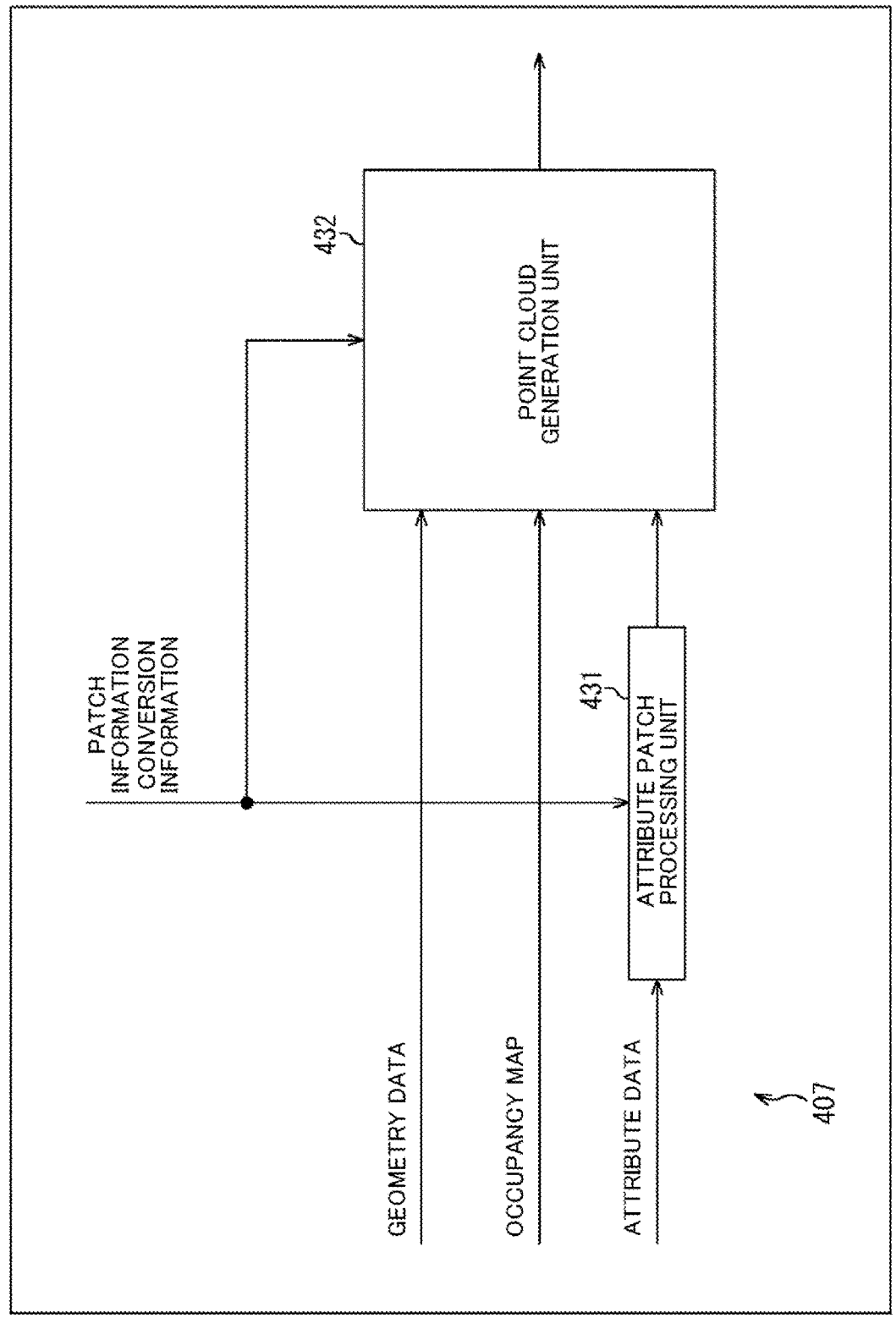
FIG. 21 is a block diagram illustrating a main configuration example of a 3D reconstruction unit.

FIG. 21 is a block diagram illustrating a main configuration example of the 3D reconstruction unit 407 in FIG. 20. In FIG. 21, the 3D reconstruction unit 407 includes an attribute patch processing unit 431 and a point cloud generation unit 432.

The attribute patch processing unit 431 acquires the attribute data, the patch information, and the conversion information (patch generation parameter), executes patch generation processing using these pieces of data, and generates the attribute patches that have not been transmitted. The attribute patch processing unit 431 supplies the attribute patch after interpolation to the point cloud generation unit 432.

The point cloud generation unit 432 acquires the geometry patch, the attribute patch, the occupancy map, the patch information, and the like, and uses these pieces of data to generate a point cloud. Since the attribute patch processing unit 431 interpolates the attribute patches that have not been transmitted as described above, the point cloud generation unit 432 can correctly generate (reconstruct) the point cloud. The point cloud generation unit 432 outputs the generated point cloud data to the outside of the decoding device 400.

<Attribute Patch Processing Unit>

Figure 22:
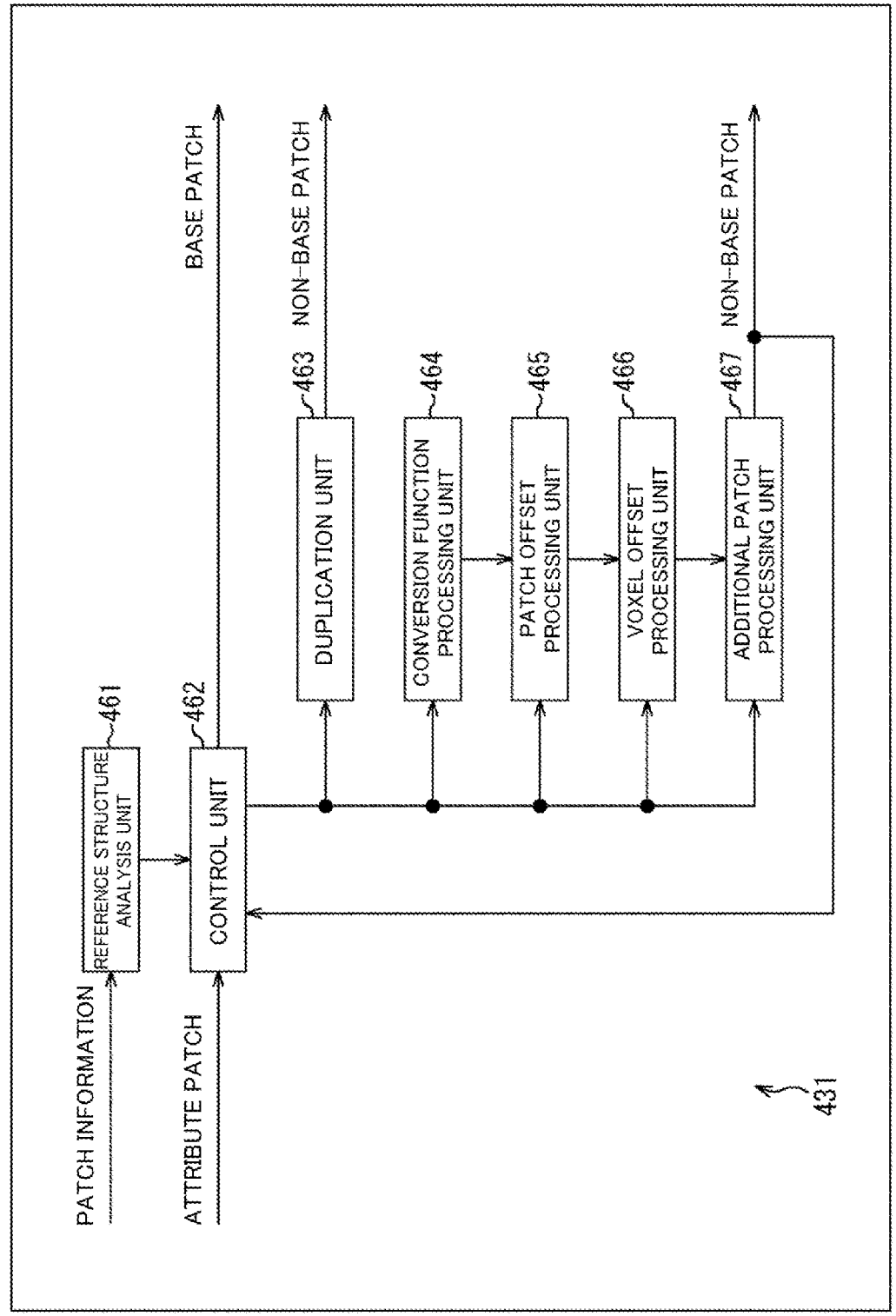
FIG. 22 is a block diagram illustrating a main configuration example of an attribute patch processing unit.

FIG. 22 is a block diagram illustrating a main configuration example of the attribute patch processing unit 431 of FIG. 21. As illustrated in FIG. 22, the attribute patch processing unit 431 includes a reference structure analysis unit 461, a control unit 462, a duplication unit 463, a conversion function processing unit 464, a patch offset processing unit 465, a voxel offset processing unit 466, an additional patch processing unit 467.

The reference structure analysis unit 461 acquires the auxiliary patch information, analyzes the reference structure between the cameras on the basis of the conversion information (patch generation parameter), and supplies a result of the analysis to the control unit 462. The control unit 462 performs control regarding processing for the attribute patch.

The duplication unit 463 duplicates a reference destination patch to generate a patch. The conversion function processing unit 464 performs conversion of patches using the conversion function. The patch offset processing unit 465 performs processing regarding addition of the patch offset. The voxel offset processing unit 466 performs processing regarding addition of the voxel offset. The additional patch processing unit 467 performs processing regarding addition of the additional patch.

The control unit 462 supplies the base patch to the point cloud generation unit 432. Further, the duplication unit 463 supplies the duplicated patch to the point cloud generation unit 432 as a non-base patch. The additional patch processing unit 467 supplies the patch to which the additional patch has been added or the patch to which the additional patch has not been added to the point cloud generation unit 432 as the non-base patch.

<Flow of Decoding Processing>

An example of a flow of the decoding processing executed by such a decoding device 400 will be described with reference to a flowchart of FIG. 23.

When the decoding processing is started, the demultiplexer 401 of the decoding device 400 demultiplexes the bitstream in step S401.

In step S402, the auxiliary patch information decoding unit 402 decodes the encoded data of the auxiliary patch information extracted from the bitstream by the processing of step S401. The conversion information (patch generation parameter) is included in this the auxiliary patch information. That is, the auxiliary patch information decoding unit 402 decodes the encoded data to generate conversion information thereof (patch generation parameter).

In step S403, the geometry video frame decoding unit 403 decodes the encoded data of the geometry video frame extracted from the bitstream through the processing of step S401.

In step S404, the attribute video frame decoding unit 404 decodes the encoded data of the attribute video frame extracted from the bitstream through the processing of step S401.

In step S405, the occupancy map decoding unit 405 decodes the encoded data of the occupancy map extracted from the bitstream through processing of step S401.

In step S406, the unpacking unit 406 unpacks the geometry video frame or attribute video frame on the basis of the occupancy map or the like to generate (restore) the patch of the geometry or the attribute.

In step S407, the 3D reconstruction unit 407 generates (reconstructs) a point cloud using the auxiliary patch information generated in step S402 and various types of information obtained in step S406.

The 3D reconstruction unit 407 outputs the obtained point cloud data to the outside of the decoding device 400. When the processing of step S407 ends, the decoding processing ends.

<Flow of 3D Reconstruction Processing>

An example of a flow of 3D reconstruction processing executed in step S407 of FIG. 23 will be described with reference to the flowchart of FIG. 24.

When the 3D reconstruction processing is started, the attribute patch processing unit 431 performs the attribute patch processing in step S431, and uses the transmitted patch generation parameter to interpolate the attribute patches that have not been transmitted.

In step S432, the point cloud generation unit 432 generates (reconstructs) a point cloud using the geometry patch and the attribute patch after interpolation.

Figure 23:
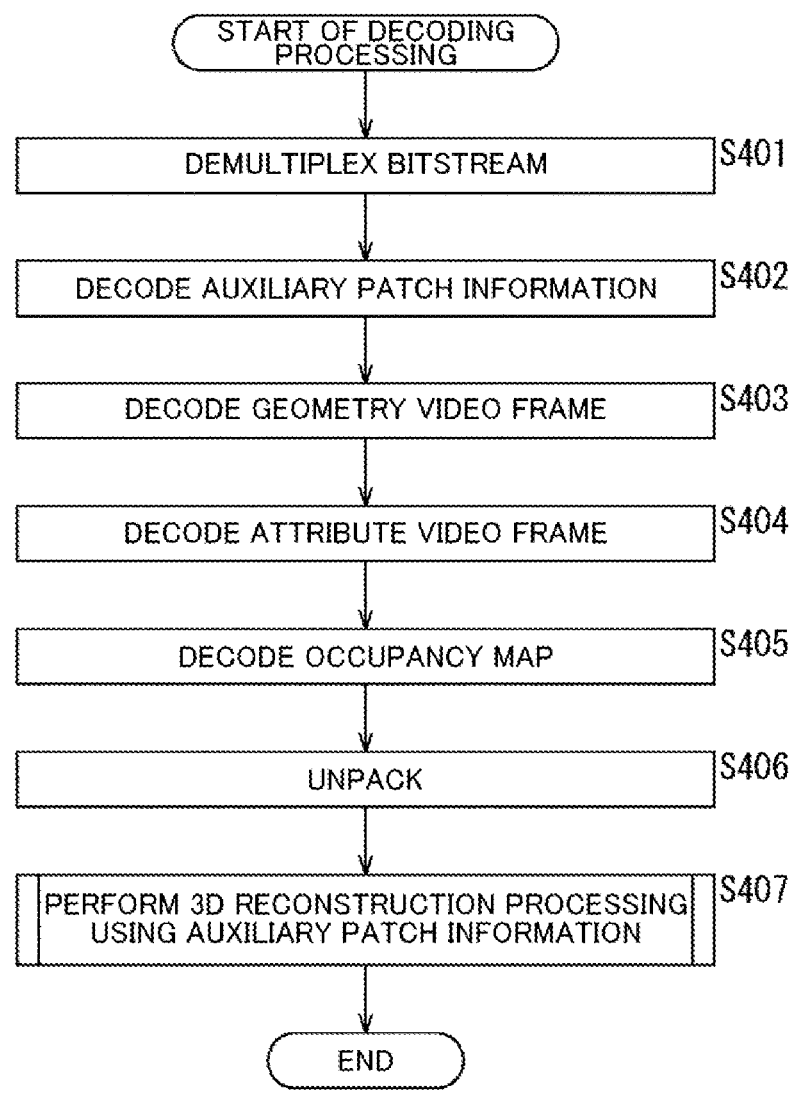
FIG. 23 is a flowchart illustrating an example of a flow of decoding processing.
Figure 24:
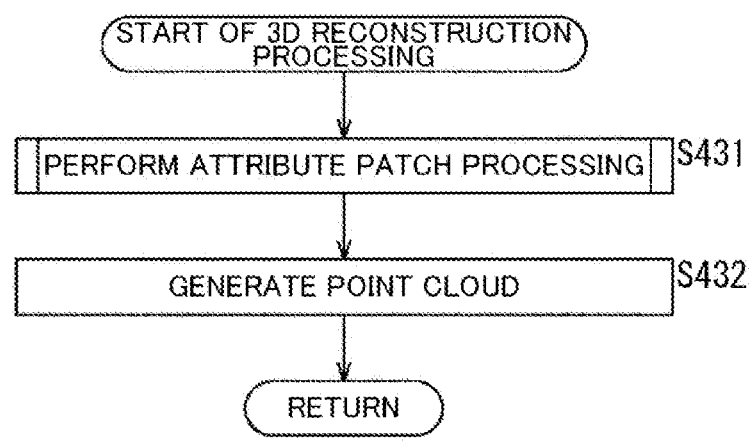
FIG. 24 is a flowchart illustrating an example of a flow of 3D reconstruction processing.

When the processing of step S432 ends, the 3D reconstruction processing ends, and the processing returns to FIG. 23.

<Flow of Attribute Patch Processing>

Figure 25:
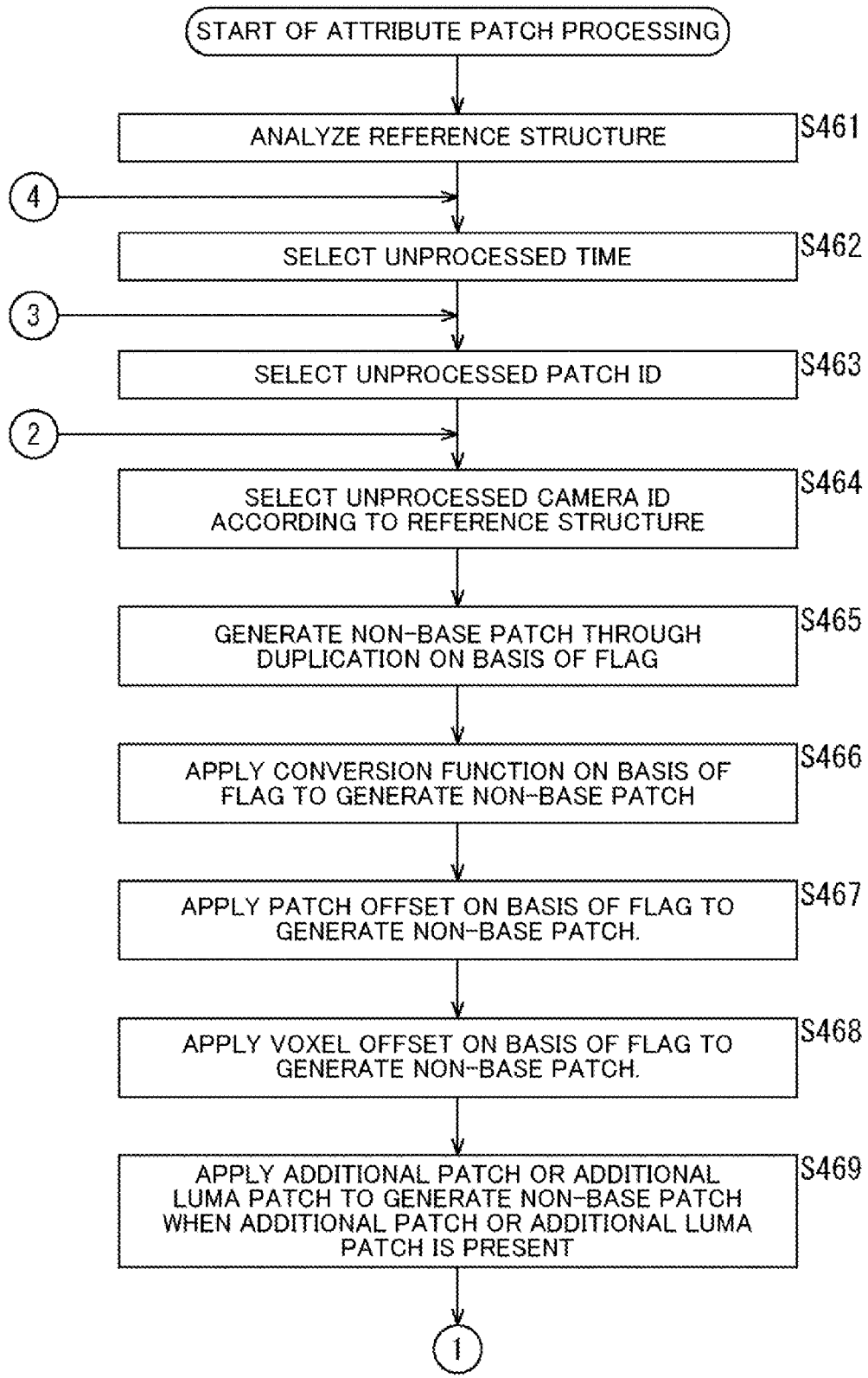
FIG. 25 is a flowchart illustrating an example of a flow of attribute patch processing.

An example of a flow of the attribute patch processing executed in step S431 of FIG. 24 will be described with reference to flowcharts of FIGS. 25 and 26.

When the attribute patch processing is started, the reference structure analysis unit 461 analyzes the reference structure in step S461.

In step S462, the control unit 462 selects an unprocessed time t as a processing target. Further, in step S463, the control unit 462 selects an unprocessed patch ID as a processing target. Further, in step S464, the control unit 462 selects an unprocessed camera ID as a processing target. In this case, the control unit 462 performs the selection according to the reference structure analyzed in step S461.

In step S465, the duplication unit 463 generates a non-base patch through duplication on the basis of the flag information (FLAG), which is the patch generation method designation information. In other words, when the flags for conversion processing, processing of any one of the patch offset and the voxel offset are false, the duplication unit 463 duplicates the reference destination patch to generate a non-base patch.

In step S467, the conversion function processing unit 464 applies the conversion function on the basis of the flag information (FLAG), which is the patch generation method designation information, to generate a non-base patch. That is, when a flag for the conversion processing is true, the conversion function processing unit 464 converts the reference destination patch using the conversion function corresponding to the conversion method designated by the conversion method designation information to generate a non-base patch. The conversion function processing unit 464 applies conversion parameter to perform patch conversion, as necessary.

In step S467, the patch offset processing unit 465 applies the patch offset on the basis of the flag information (FLAG), which is the patch generation method designation information, to generate a non-base patch. That is, when the flag for the patch offset is true, the patch offset processing unit 465 adds the signaled patch offset to the reference destination patch or a patch of the conversion result to generate a non-base patch.

In step S468, the voxel offset processing unit 466 applies the voxel offset on the basis of the flag information (FLAG), which is the patch generation method designation information, to generate a non-base patch. That is, when a flag for the voxel offset is true, the voxel offset processing unit 466 adds the signaled voxel offset to the reference destination patch, the patch of the conversion result, or the patch to which the patch offset has been added, to generate a non-base patch.

In step S468, when the additional patch or additional Luma patch is present in the transmitted attribute patch, the additional patch processing unit 467 applies the additional patch or additional Luma patch to generate the non-base patch. That is, the additional patch processing unit 467 adds the transmitted additional patch or additional Luma patch to the reference destination patch, the patch of the conversion result, the patch to which the patch offset has been added, or the patch to which the voxel offset has been added, to generate the non-base patch. When the processing of step S469 ends, the processing proceeds to FIG. 26.

Figure 26:
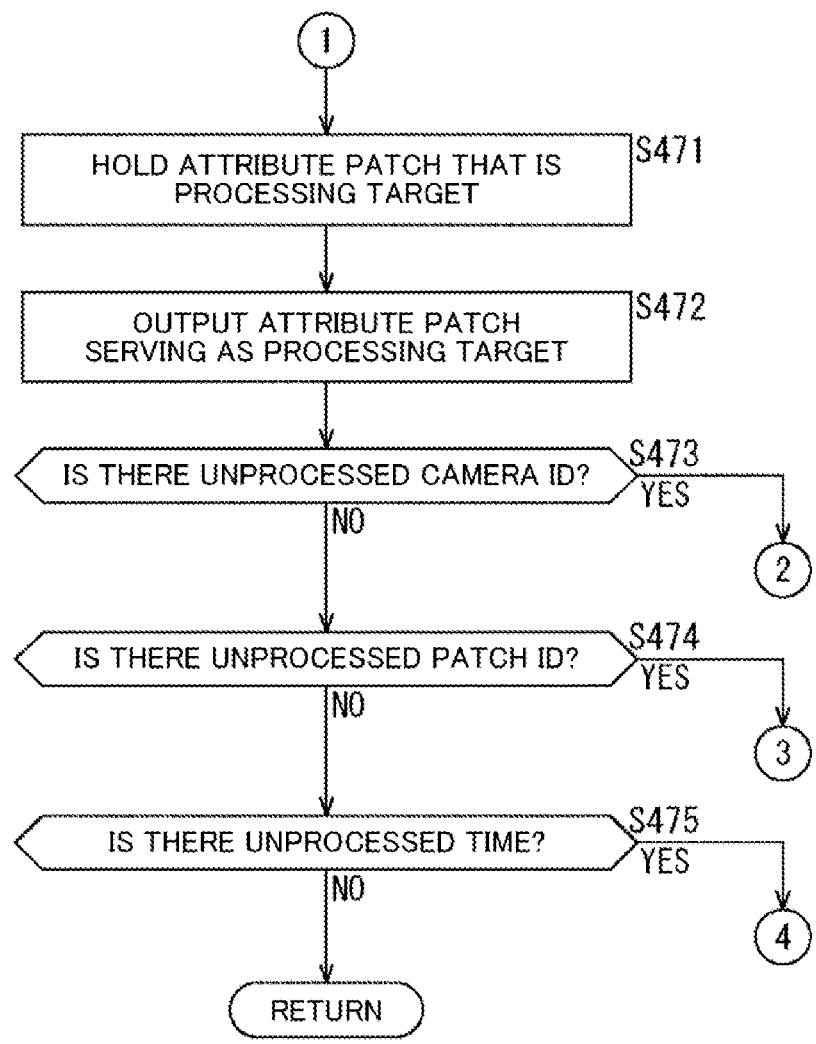
FIG. 26 is a flowchart following FIG. 18, illustrating an example of the flow of the attribute patch processing.

In step S471 of FIG. 26, the control unit 462 holds the attribute patch that is a processing target. For example, the control unit 462 holds the base patch. Further, the control unit 462 holds the non-base patch generated in the processing of any one of steps S465 to S469 in FIG. 25.

In step S472, the control unit 462 outputs the base patch serving as a processing target to the point cloud generation unit 432 as the attribute patch. Further, the duplication unit 463 outputs the non-base patch generated by duplication to the point cloud generation unit 432 as the attribute patch. Further, the additional patch processing unit 467 outputs the non-base patch to which the additional patch or the additional Luma patch has been added, or the non-base patch to which the additional patch or the additional Luma patch has not been added, to the point cloud generation unit 432 as a tribute patch.

In step S473, the control unit 462 determines whether or not there is an unprocessed camera ID. When a determination is made that there is the unprocessed camera ID, the control unit 462 returns the processing to step S464 of FIG. 25. Accordingly, the next unprocessed camera ID is selected as a processing target. That is, processing of steps S464 to S469 in FIG. 25 and steps S471 to S473 in FIG. 26 are executed for each camera ID. When a determination is made in step S473 that there is no unprocessed camera ID, that is, all the camera ID have been processed, the processing proceeds to step S474.

In step S474, the control unit 462 determines whether or not there is an unprocessed patch ID. When a determination is made that there is an unprocessed patch ID, the control unit 462 returns the processing to step S463 in FIG. 25. Accordingly, the next unprocessed patch ID is selected as the processing target. That is, processing of steps S463 to S469 in FIG. 25 and steps S471 to S474 in FIG. 26 is executed for each patch ID. When a determination is made in step S474 that there is no unprocessed patch ID, that is, all patch IDs have been processed, the processing proceeds to step S475.

In step S475, the control unit 462 determines whether or not there is an unprocessed time. When a determination is made that there is an unprocessed time, the control unit 462 returns the processing to step S462 in FIG. 25. Accordingly, the next unprocessed time is selected as a processing target. That is, each processing of steps S462 to S469 in FIG. 25 and steps S471 to S475 in FIG. 26 is performed for each time. In step S475, when a determination is made that there is no unprocessed time, that is, all times have been processed, the attribute patch processing ends, and the processing returns to FIG. 24.

By executing each processing as described above, the decoding device 400 can suppress an increase in amount of code, as described above in <1. Patch Generation in Which Other Attribute is Referred to>. Accordingly, the decoding device 400 can suppress an increase in a load of the decoding processing. Further, the decoding device 400 can suppress an increase in load (such as a load of a transmission medium or a storage medium) when encoded data is transmitted or stored. Further, the decoding device 400 can suppress an increase in costs of devices or systems regarding the video-based approach, such as the encoding device 300 itself and the decoding device 400.

4. Supplements

<Computer>

The above-described series of processing can be executed by hardware or can be executed by software. When the series of processing is executed by software, a program that constitutes the software is installed in the computer. Here, the computer includes, for example, a computer built into dedicated hardware, or a general-purpose personal computer capable of executing various functions by various programs being installed.

Figure 27:
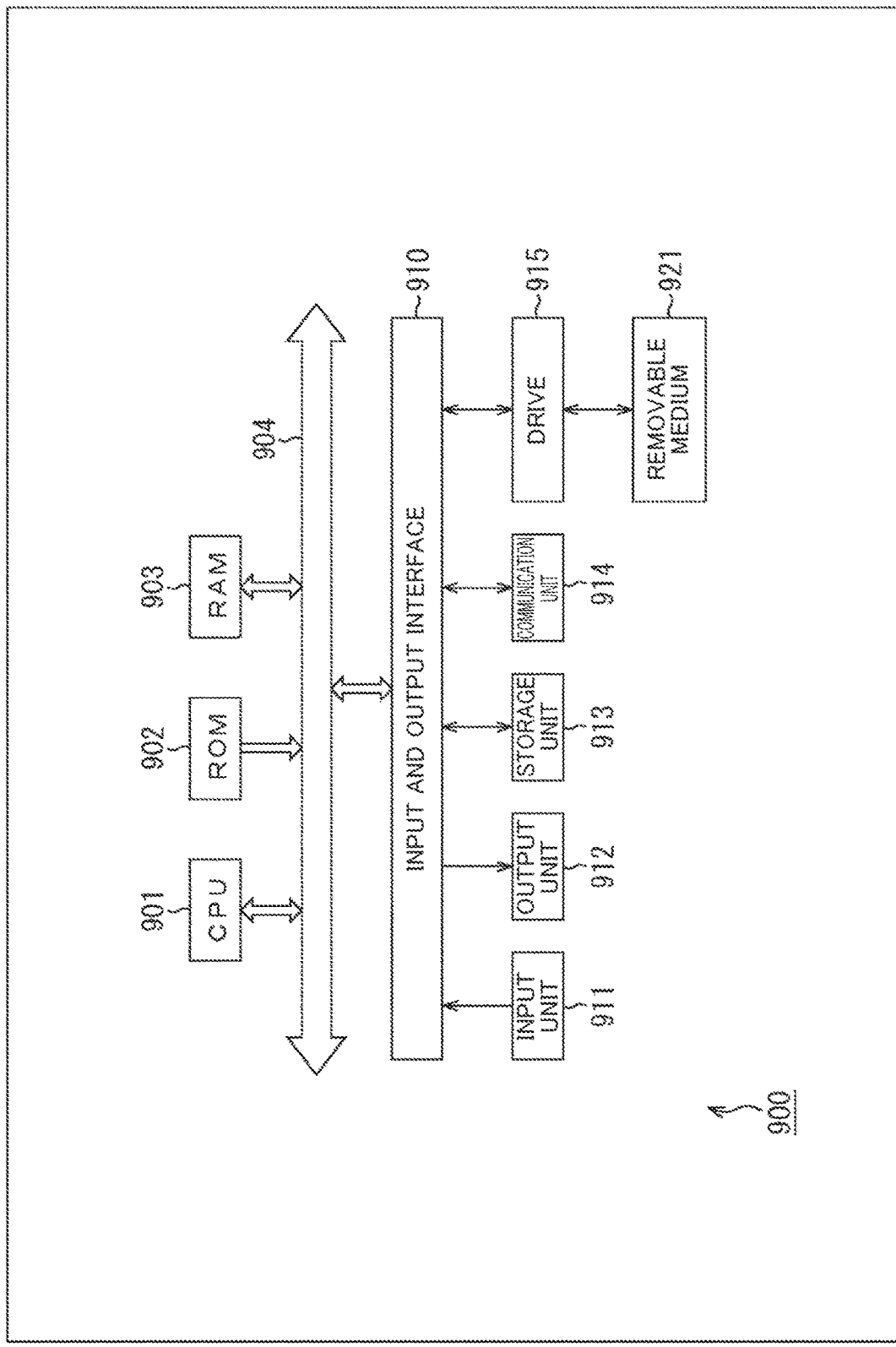
FIG. 27 is a block diagram illustrating a main configuration example of a computer.

FIG. 27 is a block diagram illustrating a configuration example of computer hardware that executes the above-described series of processing using a program.

In the computer 900 illustrated in FIG. 27, a central processing unit (CPU) 901, a read only memory (ROM) 902, and a random access memory (RAM) 903 are connected to each other via a bus 904.

An input and output interface 910 is also connected to the bus 904. An input unit 911, an output unit 912, a storage unit 913, a communication unit 914, and a drive 915 are connected to the input and output interface 910.

The input unit 911 includes, for example, a keyboard, a mouse, a microphone, a touch panel, or an input terminal. The output unit 912 includes, for example, a display, a speaker, or an output terminal. The storage unit 913 includes, for example, a hard disk, a RAM disk, or a non-volatile memory. The communication unit 914 includes, for example, a network interface. The drive 915 drives a removable medium 921 such as a magnetic disk, an optical disc, a magneto-optical disc, or a semiconductor memory.

In the computer configured as described above, the CPU 901 loads a program stored in the storage unit 913 into the RAM 903 via the input and output interface 910 and the bus 904 and executes the program, so that the above-described series of processing is performed. Further, data and the like necessary for the CPU 901 to execute various types of processing are appropriately stored in the RAM 903.

The program to be executed by the computer, for example, can be recorded on the removable medium 921 such as a package medium and applied. In this case, the program can be installed in the storage unit 913 via the input and output interface 910 by the removable medium 921 being mounted in the drive 915.

This program can also be provided via wired or wireless transfer medium such as a local area network, the Internet, and digital satellite broadcasting. In this case, the program can be received by the communication unit 914 and installed in the storage unit 913.

Alternatively, this program can be installed in the ROM 902 or the storage unit 913 in advance.

<Application Target of Present Technology>

Although a case in which the present technology is applied to encoding and decoding of the point cloud data has been described above, the present technology is not limited to these examples and can be applied to encoding and decoding of 3D data having any standard That is, any specifications of various processing such as encoding and decoding methods and various types of data such as 3D data or metadata are used as long as these do not conflict with the present technology described above. Further, some of the processing or specifications described above may be omitted as long as this does not conflict with the present technology.

Further, although the encoding device 300, the decoding device 400, and the like have been described above as application examples of the present technology, the present technology can be applied to any configuration.

The present technology can be applied to any configuration. For example, the present technology can be applied to various electronic devices such as a transmitter or a receiver (for example, a television receiver or a mobile phone) in satellite broadcasting, cable broadcasting such as a cable TV, distribution on the Internet, distribution to a terminal by cellular communication, or the like, or devices (for example, a hard disk recorder or a camera) that record images on a medium such as an optical disc, a magnetic disk, and a flash memory, and reproduce the images from the storage medium.

Further, for example, the present technology can be implemented as a part of the configuration of the device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) in which other functions are added to the unit.

Further, for example, the present technology can also be applied to a network system configured of a plurality of devices. For example, the present technology may be implemented as cloud computing in which a plurality of devices share processing and jointly perform processing via a network. For example, the present technology may be implemented in a cloud service in which a service regarding images (moving images) is provided to any terminals such as computers, audio visual (AV) device, portable information processing terminals, and Internet of Things (IoT) devices.

In the present specification, the system means a set of a plurality of components (devices, modules (parts), and the like), and it does not matter whether all the components are present in the same housing. Therefore, a plurality of devices housed in separate housings and connected via a network, and a single device in which a plurality of modules are housed in one housing are both systems.

<Field and Use to which Present Technology can be Applied>

Systems, devices, processing units, and the like to which the present technology are applied can be used in any field, such as transportation, medical care, crime prevention, agriculture, livestock industry, mining, beauty, factories, home appliances, weather, and nature monitoring. Further, the use thereof is arbitrary.

<Others>

In the present specification, the "flag" is information for identifying a plurality of states, and includes not only information used when two states including true (1) or false (0) are identified, but also information that can identify three or more states. Therefore, values of this "flag" may be, for example, two values including 1/0, or may be three or more values. That is, any number of bits may be used to constitute this "flag", and the number may be 1 bit or a plurality of bits. Further, since the identification information (including the flag) is assumed to have not only a form in which the identification information is included in a bitstream, but also a form in which difference information between the identification information and certain reference information is included in a bitstream, the "flag" or the "identification information" includes not only that information but also difference information with respect to the reference information in the present specification.

Further, various types of information (metadata, or the like) regarding the encoded data (bitstream) may be transmitted or recorded in any form as long as the information is associated with the encoded data. Here, the term "associate"

means, for example, making it possible to use (link) one piece of data when processing the other data. That is, data associated with each other may be collected as one piece of data or may be individual pieces of data. For example, information associated with encoded data (image) may be transmitted on a transmission path separate from that for the encoded data (image). Further, for example, the information associated with the encoded data (image) may be recorded on a recording medium (or a recording area of the same recording medium) separate from that for the encoded data (image). This "association" may be a part of the data instead of the entire data. For example, an image and information corresponding to the image may be associated with each other in any units of a plurality of frames, one frame, a portion within a frame, or the like.

In the present specification, terms such as "synthesize", "multiplex", "add", "integrate", "include", "store", "put in", and "insert" mean grouping a plurality of objects into one object, such as grouping encoded data and metadata into one data, and mean one method "associate" as described above.

Embodiments of the present technology are not limited to the above-described embodiments, and various changes can be made without departing from the gist of the present technology.

For example, a configuration described as one device (or processing unit) may be divided and configured as a plurality of devices (or processing units). On the other hand, the configuration described above as a plurality of devices (or processing units) may be collectively configured as one device (or processing unit). Further, of course, a configuration other than the above may be added to the configuration of each device (or each processing unit). Further, a part of a configuration of a device (or processing unit) may be included in a configuration of another device (or another processing unit) as long as a configuration or operation of the system as a whole is substantially the same.

Further, for example, the above-described program may be executed in any device. In this case, the device only needs to have necessary functions (functional blocks, and the like) and to be able to obtain necessary information.

Further, for example, each step of one flowchart may be executed by one device, or may be shared and executed by a plurality of devices. Further, when a plurality of processing are included in one step, one device may execute the plurality of processing, or the plurality of devices may share and execute the plurality of processing. In other words, it is also possible to execute the plurality of processing included in one step as processing of a plurality of steps. On the other hand, it is also possible to execute processing described as a plurality of steps collectively as one step.

Further, for example, in a program that is executed by a computer, processing of steps describing the program may be executed in time series in an order described in the present specification, or may be executed in parallel or individually at a required timing such as when call is made. That is, the processing of the respective steps may be executed in an order different from the above-described order as long as there is no contradiction. Further, the processing of the steps describing this program may be executed in parallel with processing of another program, or may be executed in combination with the processing of the other program.

Further, for example, a plurality of technologies regarding the present technology can be independently implemented as a single body as long as there is no contradiction. Of course, it is also possible to perform any plurality of the present technologies in combination. For example, it is also possible to implement some or all of the present technologies described in any of the embodiments in combination with some or all of the technologies described in other embodiments. Further, it is also possible to implement some or all of any of the above-described technologies in combination with other technologies not described above.

The present technology can also take the following configuration.

(1) An image processing device including:
    a patch generation parameter derivation unit configured to derive a patch generation parameter used in patch generation processing for generating a patch of an attribute serving as a processing target by referring to an attribute different from the attribute serving as the processing target, for some of a plurality of attributes corresponding to single geometry of a point cloud that expresses an object having a three-dimensional shape as a set of points;
    a patch generation parameter encoding unit configured to encode the patch generation parameter derived by the patch generation parameter derivation unit; and
    an attribute video frame encoding unit configured to encode an attribute video frame in which a base patch representing a base attribute that is an attribute different from some of the plurality of attributes has been arranged, and omit encoding of the attribute video frame in which patches representing some of the attributes have been arranged.

(2) The image processing device according to (1), wherein the patch generation parameter includes a patch offset, the patch offset being an offset in units of patches added to a reference destination patch of the attribute different from the attribute serving as the processing target, the different attribute being a reference destination in the patch generation processing.

(3) The image processing device according to (1) or (2), wherein the patch generation parameter includes a voxel offset, the voxel offset being an offset in units of voxels added to a reference destination patch of an attribute different from the attribute serving as the processing target, which is a reference destination in the patch generation processing.

(4) The image processing device according to any one of (1) to (3), wherein the patch generation parameter includes conversion method designation information for designating a conversion method for a reference destination patch of the attribute different from the attribute serving as the processing target, the different attribute being a reference destination in the patch generation processing.

(5) The image processing device according to (4), wherein the patch generation parameter further includes a conversion parameter applied in the conversion method designated by the conversion method designation information.

(6) The image processing device according to any one of (1) to (5), wherein the patch generation parameter includes reference destination designation information for designating the attribute different from the attribute serving as the processing target, the different attribute being a reference destination in the patch generation processing.

(7) The image processing device according to any one of (1) to (6), wherein the patch generation parameter includes patch generation method designation information for designating a method for generating a patch of the attribute serving as the processing target, the method being applied in the patch generation processing.

(8) The image processing device according to any one of (1) to (7), wherein the patch generation parameter derivation unit further includes an additional patch generation unit configured to generate an additional patch to be added to the reference destination patch of the attribute different from the attribute serving as the processing target, the reference destination patch being a reference destination in the patch generation processing, wherein the attribute video frame encoding unit further encodes the additional patch generated by the additional patch generation unit.

(9) The image processing device according to (8), wherein the additional patch includes only a luminance component.

(10) The image processing device according to any one of (1) to (9), wherein the plurality of attributes each include textures of the object obtained at different viewpoints.

(11) An image processing method including:
deriving a patch generation parameter used in patch generation processing for generating a patch of an attribute serving as a processing target by referring to an attribute different from the attribute serving as the processing target, for some of a plurality of attributes corresponding to single geometry of a point cloud that expresses an object having a three-dimensional shape as a set of points; encoding the derived patch generation parameter; and
encoding an attribute video frame in which a base patch representing a base attribute that is an attribute different from some of the plurality of attributes has been arranged, and omitting encoding of the attribute video frame in which patches representing some of the attributes have been arranged.

(12) An image processing device including:
a patch generation parameter decoding unit configured to decode encoded data, and generate a patch generation parameter used in patch generation processing for generating a patch of an attribute serving as a processing target by referring to an attribute different from the attribute serving as the processing target, for some of a plurality of attributes corresponding to single geometry of a point cloud that expresses an object having a three-dimensional shape as a set of points;
a patch generation processing unit configured to perform the patch generation processing using the patch generation parameter generated by the patch generation parameter decoding unit and a base patch representing a base attribute that is an attribute different from some of the attributes, to obtain the patches of some of the attributes; and
a point cloud generation unit configured to generate the point cloud using the base patch and the patch obtained by the patch generation processing unit performing the patch generation processing.

(13) The image processing device according to (12), wherein the patch generation parameter includes a patch offset that is an offset in units of patches, and
the patch generation processing unit adds the patch offset to a reference destination patch of the attribute different from the attribute serving as the processing target, the different attribute being a reference destination in the patch generation processing.

(14) The image processing device according to (12) or (13),
wherein the patch generation parameter includes a voxel offset, the voxel offset being an offset in units of voxels, and
the patch generation processing unit adds the voxel offset to a reference destination patch of the attribute different from the attribute serving as the processing target, the different attribute being a reference destination in the patch generation processing.

(15) The image processing device according to any one of (12) to (14),
wherein the patch generation parameter includes conversion method designation information for designating a patch conversion method, and
the patch generation processing unit converts a reference destination patch of the attribute different from the attribute serving as the processing target, the different attribute being a reference destination in the patch generation processing, using the conversion method designated by the conversion method designation information.

(16) The image processing device according to (15),
wherein the patch generation parameter further includes a conversion parameter, and
the patch generation processing unit further applies the conversion parameter to convert the reference destination patch in the patch generation processing.

(17) The image processing device according to any one of (12) to (16),
wherein the patch generation parameter includes reference destination designation information for designating the attribute different from the attribute serving as the processing target, the different attribute being a reference destination, and
the patch generation processing unit obtains the patches of some of the attributes by performing the patch generation processing with the attribute designated by the reference destination designation information as a reference destination.

(18) The image processing device according to any one of (12) to (17),
wherein the patch generation parameter includes patch generation method designation information for designating the patch generation method, and
the patch generation processing unit obtains the patches of some of the attributes by applying the generation method designated by the patch generation method designation information and performing the patch generation processing.

(19) The image processing device according to any one of (12) to (18), further including:
an additional patch decoding unit configured to decodes encoded data to generate an additional patch,
wherein the patch generation processing unit adds the additional patch generated by the additional patch decoding unit to a reference destination patch of the attribute different from the attribute serving as the processing target, the different attribute being a reference destination in the patch generation processing.

(20) The image processing device according to (19), wherein the additional patch includes only a luminance component.

(21) The image processing device according to any one of (12) to (20), wherein the plurality of attributes each include textures of the object obtained at different viewpoints.

(22) An image processing method including:
decoding encoded data, and generating a patch generation parameter used in patch generation processing for generating a patch of an attribute serving as a processing target by referring to an attribute different from the attribute serving as the processing target, for some of a plurality of attributes corresponding to single geometry of a point cloud that expresses an object having a three-dimensional shape as a set of points;
performing the patch generation processing using the generated patch generation parameter and a base patch representing a base attribute that is an attribute different from some of the attributes, to obtain the patches of some of the attributes; and generating the point cloud using the base patch, and the patch obtained by performing the patch generation processing.

REFERENCE SIGNS LIST

300 Encoding device
301 Decomposition processing unit
302 Packing unit
303 Auxiliary patch information generation unit
304 Auxiliary patch information compression unit
305 Geometry video frame encoding unit
306 Attribute video frame encoding unit
307 Occupancy map encoding unit
308 Multiplexer
331 Patch decomposition unit
332 Attribute patch processing unit
361 Control unit
362 Difference calculation unit
363 Duplication unit
364 Conversion function processing unit
365 Patch offset processing unit
366 Voxel offset processing unit
367 Conversion information Processing unit
368 Additional patch processing unit
400 Decoding device
401 Demultiplexer
402 Auxiliary patch information decoding unit
403 Geometry video frame decoding unit
404 Attribute video frame decoding unit
405 Occupancy map decoding unit
406 Unpacking unit
407 3D reconstruction unit
431 Attribute patch processing unit
432 Point cloud generation unit
461 Reference structure analysis unit
462 Control unit
463 Duplication unit
464 Conversion function processing unit
465 Patch offset processing unit
466 Voxel offset processing unit
467 Additional patch processing unit

The invention claimed is:

1. An image processing device comprising:
circuitry configured to
derive, from data of a three-dimensional object expressed using a set of points, first attribute data and second attribute data that respectively correspond to a first viewpoint and a second viewpoint different from each other and each correspond to a same geometry of the three-dimensional object,
generate a base patch and a difference patch based on the first attribute data and the second attribute data, wherein
the base patch corresponds to the first attribute data and does not refer to the difference patch, and
the difference patch corresponds to a difference between the first attribute data and the second attribute data,
derive a patch generation parameter for decoding the difference patch by referring to the first attribute data, and
encode the patch generation parameter and an attribute video frame including the base patch without encoding an attribute video frame including a patch indicating the second attribute.

2. The image processing device according to claim 1, wherein the patch generation parameter includes a patch offset, and
wherein the patch offset is a common offset applied to a plurality of points of the difference patch to be decoded.

3. The image processing device according to claim 1, wherein the patch generation parameter includes voxel offsets, and
wherein the voxel offsets are different from each other and are applied to respective voxels of the difference patch to be decoded.

4. The image processing device according to claim 1, wherein the patch generation parameter includes conversion method designation information for designating a conversion method of the base patch for deriving the difference patch.

5. The image processing device according to claim 4, wherein the patch generation parameter further includes a conversion parameter applied in the conversion method.

6. The image processing device according to claim 1, wherein the patch generation parameter includes reference destination designation information for designating a reference ID of the base patch.

7. The image processing device according to claim 1, wherein the patch generation parameter includes patch generation method designation information indicating whether to apply, to the base patch, at least one of a patch offset, a voxel offset or a conversion function to generate the difference patch.

8. The image processing device according to claim 1, wherein the difference patch includes only a luminance component.

9. An image processing method comprising:
deriving, from data of a three-dimensional object expressed using a set of points, first attribute data and second attribute data that respectively correspond to a first viewpoint and a second viewpoint different from each other and each correspond to a same geometry of the three-dimensional object;
generating a base patch and a difference patch based on the first attribute data and the second attribute data, wherein
the base patch corresponds to the first attribute data and does not refer to the difference patch, and
the difference patch corresponds to a difference between the first attribute data and the second attribute data,
deriving a patch generation parameter for decoding the difference patch by referring to the first attribute data;
encoding the patch generation parameter and an attribute video frame including the base patch without encoding an attribute video frame including a patch indicating the second attribute.

10. An image processing device comprising:
circuitry configured to
decode encoded data of a three-dimensional object expressed using a set of points to derive a base patch and a patch generation parameter for generating a difference patch, wherein
the base patch and the difference patch respectively correspond to first attribute data and second attribute data of the three-dimensional object,
the base patch and the difference patch respectively correspond to a first viewpoint and a second viewpoint different from each other, each of the base patch and the difference patch corresponds to a same geometry of the three-dimensional object, the base patch does not refer to the difference patch, and the difference patch corresponds to a difference between the first attribute data and the second attribute data, generate, based on the patch generation parameter, the difference patch by referring to the base patch, and reconstruct three-dimensional data of the three-dimensional object using the base patch and the difference patch.

11. The image processing device according to claim 10, wherein the patch generation parameter includes a patch offset, and wherein the circuitry is further configured to apply the patch offset to a plurality of points of the difference patch.

12. The image processing device according to claim 10, wherein the patch generation parameter includes voxel offsets, wherein the voxel offsets are different from each other, and wherein the circuitry is configured to apply the voxel offsets to respective voxels of the difference patch.

13. The image processing device according to claim 10, wherein the patch generation parameter includes conversion method designation information for designating a patch conversion method, and wherein the circuitry is further configured to convert the based patch into the difference patch using the patch conversion method.

14. The image processing device according to claim 13, wherein the patch generation parameter further includes a conversion parameter, and wherein the circuitry is further configured to apply the conversion parameter to convert the base patch into the difference patch.

15. The image processing device according to claim 10, wherein the patch generation parameter includes reference destination designation information for designating a reference ID of the base patch, and wherein the circuitry is further configured to generate the difference patch with attribute data based on the base patch having the reference ID.

16. The image processing device according to claim 10, wherein the patch generation parameter includes patch generation method designation information indicating whether to apply, to the base patch, at least one of a patch offset, a voxel offset, or a conversion function, and wherein the circuitry generates, based on the patch generation method designation information, the difference patch by applying at least one of the patch offset, the voxel offset, or the conversion function to the base patch.

17. The image processing device according to claim 10, wherein the difference patch includes only a luminance component.

18. An image processing method comprising:

decoding encoded data of a three-dimensional object expressed using a set of points to derive a base patch and a patch generation parameter for generating a difference patch, wherein the base patch and the difference patch respectively correspond to first attribute data and second attribute data of the three-dimensional object, the base patch and the difference patch respectively correspond to a first viewpoint and a second viewpoint different from each other, each of the base patch and the difference patch corresponds to a same geometry of the three-dimensional object, the base patch does not refer to the difference patch, and the difference patch corresponds to a difference between the first attribute data and the second attribute data;

generate, based on the patch generation parameter, the difference patch by referring to the base patch; and reconstructing three-dimensional data of the three-dimensional object using the base patch and the difference patch.

* * * * *